US008589018B2

(12) United States Patent  
Sarnacke et al.

(10) Patent No.: US 8,589,018 B2  
(45) Date of Patent: Nov. 19, 2013

(54) VEHICLE DIAGNOSTIC TOOL WITH COPY PROTECTION AND AUTOMATIC IDENTIFICATION OF VEHICLE ECUS AND FAULT DISPLAY

(75) Inventors: James G. Sarnacke, Macomb, MI (US); Paul Garibay, Pontiac, MI (US); Michael D. Laferle, Shelby Township, MI (US); Dan O. Morris, Troy, MI (US); David F. Skladanowski, Warren, MI (US); Venkateshwar Sinha, Rochester Hills, MI (US); David Paul Shock, Clinton Township, MI (US)

(73) Assignee: IDSC Holdings, LLC, Kenosha, WI (US)

( * ) Notice: Subject to any disclaimer, the term of this patent is extended or adjusted under 35 U.S.C. 154(b) by 404 days.

(21) Appl. No.: 12/702,694

(22) Filed: Feb. 9, 2010

(65) Prior Publication Data

US 2010/0205450 A1 Aug. 12, 2010

Related U.S. Application Data

(60) Provisional application No. 61/151,165, filed on Feb. 9, 2009.

(51) Int. Cl.  
*G06F 19/00* (2011.01)

(52) U.S. Cl.  
USPC ........... 701/29.2; 701/33.4; 701/33.2; 701/33

(58) Field of Classification Search  
USPC ............. 701/29, 33, 2, 31.5, 35, 1, 213, 29.1, 701/29.2, 33.2, 33.4; 709/249, 250; 710/62, 710/72; 370/464–467; 707/100; 340/5.2, 340/5.23, 5.61, 568.2, 439; 713/185  
See application file for complete search history.

(56) References Cited

U.S. PATENT DOCUMENTS

| | | | |
|---|---|---|---|
| 7,305,289 B2 * | 12/2007 | Gessner et al. | 701/34.3 |
| 7,363,129 B1 * | 4/2008 | Barnicle et al. | 701/1 |
| 2003/0222982 A1 * | 12/2003 | Hamdan et al. | 348/148 |
| 2005/0089055 A1 * | 4/2005 | Klose et al. | 370/419 |
| 2005/0165806 A1 * | 7/2005 | Roatis et al. | 707/100 |
| 2005/0212656 A1 * | 9/2005 | Denison et al. | 340/5.73 |
| 2005/0285716 A1 * | 12/2005 | Denison et al. | 340/5.2 |
| 2008/0071439 A1 * | 3/2008 | Bertosa et al. | 701/29 |
| 2008/0195299 A1 * | 8/2008 | Barnicle et al. | 701/115 |

* cited by examiner

*Primary Examiner* — Ronnie Mancho  
(74) *Attorney, Agent, or Firm* — McDermott Will & Emery LLP

(57) ABSTRACT

A diagnostic tool for a vehicle configured to automatically identify different communication protocols used by Electronic Control Units (ECUs) on-board the vehicle. The diagnostic tool includes a connector connectable to a data port of the vehicle; a data processor and a data storage device configured to store a list of different communication protocols. The data processor automatically initiates communications with the ECUs on-board the vehicle using a first communication protocol and if the data processor receives a response comporting to the first communication protocol, the data processor determines that at least one ECU on-board the vehicle is using the first communication protocol. Additionally, the data processor automatically initiates communications with the ECUs on-board the vehicle using a second communication protocol and if the data processor receives a response comporting to the second communication protocol, the data processor determines that at least one ECU on-board the vehicle is using the second communication protocol.

24 Claims, 23 Drawing Sheets

○ Vehicle Scanned

○ Searching for Faults...

Engine #1: Heavy Duty Standard

VEHICLE DIAGNOSTIC TOOL WITH COPY PROTECTION AND AUTOMATIC IDENTIFICATION OF VEHICLE ECUS AND FAULT DISPLAY

RELATED APPLICATIONS

This application claims priority from U.S. Provisional Application having Ser. No. 61/151,165 filed Feb. 9, 2009, the entire content of which is hereby incorporated by reference.

FIELD OF DISCLOSURE

The present disclosure relates to vehicle diagnostic methods and systems, and more specifically, to a vehicle diagnostic tool with copy protection and automatic identification of vehicle ECUs and fault display.

BACKGROUND

Modern vehicles typically are equipped with an on-board computer system or diagnostic system including one or more computer control modules controlling various functions of the vehicle. The terms on-board computer system and diagnostic system are used interchangeably throughout this disclosure. Some examples include powertrain control module (PCM), engine control module (ECM), a transmission control module (TCM), anti-locking brake system (ABS), and an air bag control module (collectively "electronic control modules (ECUs)"). The on-board computers often have self-diagnostic capability. When a problem is found, a diagnostic trouble code (DTC) is set within the computer's memory. DTCs are as general or as specific as the manufacturer desires.

One type of on-board computer system complies with an industry standard called On-Board Diagnostic II (OBD II). OBD II monitors all engine and drive train sensors and actuators for shorts, open circuits, lazy sensors and out-of-range values as well as values that do not logically fit with other powertrain data. Thus, OBD II keeps track of all of the components responsible for emissions and when one of them malfunctions, it signals the vehicle owner by illuminating a Maintenance Indicator Lamp (MIL), such as a check engine indicator. It also stores DTCs designed to help a technician find and repair the emission related problems.

Other types of on-board computer systems may employ communication protocols different from OBD II, such as different types of communication standards defined by different organizations or proprietary communication protocols defined by makers of ECUs. For instance, while OBD II are common on passenger vehicles, heavy duty vehicles often use a communication protocol different from OBD II, such as SAE J1708, SAE J1939, etc. Some OEM parts installed on a vehicle may include ECUs using a communication standard different from those already used on-board the vehicle. For instance, electronic braking, stability, suspension and transmission automation systems provided by WABCO Vehicle Control Systems utilize a communication protocol unique to WABCO systems.

To retrieve and decipher DTCs, an auto repair technician connects a scan tool to the vehicle's computer bus system via one or more connectors or data ports on-board the vehicle, to access and retrieve the DTCs, and to interface with vehicle diagnostic systems to retrieve information from the various control modules. Configurations of the connectors may be proprietary or comport to one or more industry standards. Different types of on-board computer systems may use different types of connectors or the same type of connector, to output diagnostic data. For instance, on-board computer systems comporting to SAE J1708 and SAE J1939 standards both use the same type of 9-pin or 6-pin Deutsch connector, while OBD II defines a unique OBD II connector for outputting data.

However, using a scan tool to download error code from a vehicle's diagnostic systems may be tedious and requires a lot of training and substantial knowledge about vehicles under test and specific types of on-board computer systems or ECUs used in different make and model of vehicles, and the underlying communication protocols needed to communicate with different types of on-board computer systems or ECUs. Before each scan, a technician needs to know what types of ECUs are installed on a vehicle under service and what types of communication protocols are used by the ECUs, such that correct types of software applications can be selected and launched on the scan tool to perform diagnoses, and correct commands can be issued to communicate with ECUs on-board the vehicle.

For instance, both SAE J1708 and SAE J1939 use the same type of Deutsch connector to output error code. For a vehicle with a Deutsch connector, a technician may not know exactly what the underlying communication protocol is being used and hence will have difficulties knowing what software applications are needed to properly communicate with the on-board computer and download error codes.

The technician also needs to be familiar with the structure of each software application so that he or she can properly locate the downloaded DTCs, which may be embedded under layers of menu selections.

Therefore, there is a need for a highly automated diagnostic tool, such as a scan tool, that can automatically identify the types of ECUs and/or communication protocols being used on a vehicle, and automatically select and launch corresponding software applications to communicate with the ECUs to retrieve error codes from the vehicle on-board computer.

SUMMARY

In one general aspect, described is a diagnostic tool for a vehicle configured to automatically identify different communication protocols used by Electronic Control Units (ECUs) on-board the vehicle. The diagnostic tool includes a connector connectable to a data port of the vehicle; a data processor and a data storage device configured to store a list of different communication protocols. The data processor automatically initiates communications with the ECUs on-board the vehicle using a first communication protocol and if the data processor receives a response comporting to the first communication protocol, the data processor determines that at least one ECU on-board the vehicle is using the first communication protocol. Additionally, the data processor automatically initiates communications with the ECUs on-board the vehicle using a second communication protocol and if the data processor receives a response comporting to the second communication protocol, the data processor determines that at least one ECU on-board the vehicle is using the second communication protocol.

The above general aspect may include one or more of the following features. The data processor may generate a list identifying ECUs communicating with the first communication protocol and ECUs communicating with the second communication protocol. The data processor may automatically initiate communications with the ECUs on-board the vehicle using a third communication protocol and if the data processor receives no response comporting to the third communication protocol, the data processor may determine the vehicle does not include ECUs comporting to the third communication protocol.

The data processor may sequentially initiate communications with the ECUs on-board the vehicle using the first and second communication protocols. Alternatively, the data processor may concurrently initiate communications with the ECUs on-board the vehicle using the first and second communication protocols.

The list may include all communication protocols associated with different vehicles serviced by the diagnostic tool. The vehicles may include passenger vehicles, cargo vehicles, heavy duty vehicles, construction equipment agricultural equipment, industrial equipment, harvest equipment, or paving equipment. The ECUs may include at least one of a powertrain control module (PCM), an engine control module (ECM), a transmission control module (TCM), an anti-locking brake system (ABS), and an air bag control module.

The diagnostic tool may further include a connection driver configured to control coupling of the connector to the data port of the vehicle. Additionally or alternatively, the diagnostic tool may include an input device configured to receive an input from the user. The input device may be configured to receive user's protocol preferences or types of vehicles serviced by the diagnostic tool. The various communication protocols may include J1708, J1939, or 160 Baud.

The data storage device may further store a list of software applications for execution by the data processor. The data processor may be further configured to use the list of software applications stored at the storage device to automatically identify a software application associated with the at least one ECU comporting to the first communication protocol and a software application associated with the at least one ECU comporting to the second communication protocol. The software applications may be usable to perform diagnostic or download information from the ECUs on-board the vehicle.

The software applications may be usable to retrieve error codes from the ECUs on-board the vehicle. The diagnostic tool may enable the user to manually select a software application for identified ECUs on-board the vehicle. The data processor may automatically launch the software applications associated with identified ECUs on-board the vehicle. The software applications may include at least one of OEM and Heavy Duty Standard applications. The software applications may include evaluation software applications which are subject to a limited number of usages.

The diagnostic tool may solicit from the user an activation key to unlock software applications that have exceeded their limited number of usages. The data processor may receive the activation key from the user for unlocking a particular software application, and the data processor may verify the received activation key to ensure that it corresponds to the particular software application and the diagnostic tool.

In another general aspect, described is a method for activating a software application on a diagnostic tool. The method includes steps of receiving, from a user, a first key and a serial number associated with the diagnostic tool; determining whether the first key corresponds to the serial number associated with the diagnostic tool; and upon determining that the first key corresponds to the serial number associated with the diagnostic tool, registering the diagnostic tool. The method also includes steps of receiving, from the user, a request for activating a software application stored on the diagnostic tool; in response to the request, requesting from the user a second key associated with the software application; receiving, from the user, the second key associated with the software application; determining whether the second key is valid; and upon determining that the second key is valid, providing an activation key to the user for activating the software application on the diagnostic tool.

The above general aspect may include one or more of the following features. For example, the software application may include a software application that is in evaluation mode and expired. The step of determining whether the second key is valid may include determining whether the second key does not belong to another software application. Alternatively or additionally, the step of determining whether the second key is valid may include determining whether the second key has not been used to activate the software application in another diagnostic tool.

BRIEF DESCRIPTIONS OF THE DRAWINGS

The drawing figures depict one or more implementations in accord with the present teachings, by way of example only, not by way of limitation. In the figures, like reference numerals refer to the same or similar elements.

DETAILED DESCRIPTIONS

Figure 1:
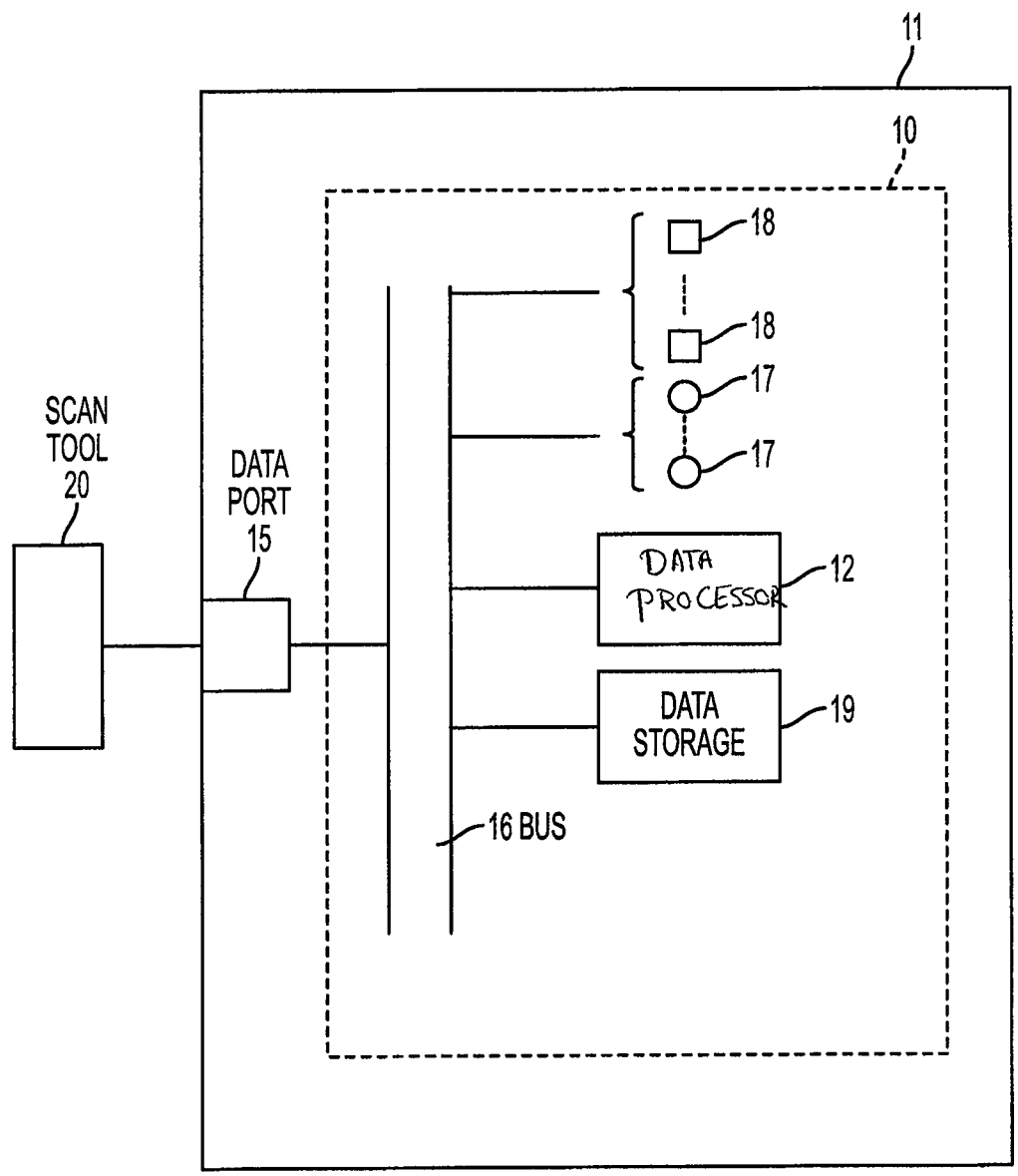
FIG. 1 illustrates an exemplary on-board computer system for use with a vehicle.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

One aspect of this disclosure is a highly automated vehicle diagnostic tool that automatically identifies the types of ECUs or diagnostic systems installed on a vehicle, launches proper software applications corresponding to the ECUs or diagnostic systems, and loads fault information from the ECUs or diagnostic systems, without the need of any prior knowledge of what ECUs are installed on-board the vehicle, or what communication protocols need to be used to communicate with the ECUs or diagnostic systems, or what types of software applications are needed to perform diagnosis or download information from ECUs or diagnostic systems on-board the vehicle.

An exemplary diagnostic tool includes a connector connectable to a vehicle data port of a vehicle, an input device configured to receive a user input entered by a user, a data processor configured to process data, and a data storage device configured to store software for execution by the data processor and maintain a list of communication protocols, and a communication interface configured to condition signals to comport to the communication protocols, and a display configured to output information to the user.

The data processor, upon execution of the software, controls the tool to perform predetermined functions. Responsive to the user input indicating a power-on event or a start scanning event, for each respective one of the communication protocols, the tool automatically initiates communication with the vehicle using the respective communication protocol. If a proper response comporting to the respective communication protocol is received from the vehicle, the tool determines that at least one control unit on-board the vehicle is using the respective communication protocol, and establishes communications with the at least one control unit using the respective communication protocol to collect information related to the at least one control unit.

The tool determines the identity of the at least one control unit based on the collected information, and launches a software application corresponding to the at least one control unit. In one aspect, the software application is automatically launched without requiring the user to push any button or enter any input. In another aspect, the software application is launched with minimal user intervention. For instance, a list of suggested software applications suitable to or usable with the identified control units is displayed to the user, to solicit a selection from the user to launch selected software applications. In another embodiment, the tool displays a message requesting a user confirmation to launch software applications automatically.

Fault information related to the at least one control unit is collected from the vehicle via the data port using the respective communication protocol and stored in the data storage device. If a proper response comporting to the respective communication protocol is not received, the tool determines that the vehicle does not have any control unit using the respective communication protocol. These steps are performed for each of the communication protocols.

In one embodiment, the collected fault information is displayed to the user. In one aspect, the fault information is automatically displayed. In another aspect, a message is displayed requesting the user's confirmation to display the fault information.

The tool may perform the communications with the vehicle using each of the communication protocols sequentially, one at a time. In still another embodiment, the tool performs the communications with the vehicle using multiple communication protocols concurrently or in parallel. According still another embodiment, the tool connects to multiple data ports on-board the vehicle.

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

System Architecture

FIG. 1 shows an exemplary on-board computer system 10 for use with a vehicle 11. Sensors 17 and Electronic Control Units (ECUs) 18 are disposed at various portions of vehicle 11 to control the operations, and collect operation data, of various subsystems or parts of the vehicle, such as engine, transmission, tires, electronic system, air conditioning, oil level, emission, etc. System 10 further includes a data processor 12 and a data storage device 19 for storing data. Examples of data storage device 19 include floppy disks, hard disk drives, magnetic tapes, optical disks, such as CD-ROM, DVD, semiconductor storage devices, such as RAM, PROM, and EPROM, FLASH-EPROM, memory chips or cartridges, etc., or any combination(s) thereof.

Data processor 12, data storage device 19, sensors 17 and ECUs 18 are coupled to a diagnostic bus 16. Data processor 12 performs diagnoses on various subsystems of vehicle 11 based on information provided by ECUs 18 and sensors 17, and records error codes in data storage device 19. A data port 15 is provided for coupling to external devices, such as a scan tool 20. Configurations of data port 15 depend on a type of communication protocol used by system 10 or ECUs 18. Examples of data port 15 include OBD II interface, USB connectors, Deutsch comporting to various types of standards, such as SAE J1708, SAE J1939, J1587, etc., proprietary connectors, wireless transceivers, or any type of data outlet for transmitting data.

Scan tools are widely used in the automotive diagnostic industry for communicating with, or downloading data from, on-board computers. Examples of scan tools include SOLUS™ Scanner made by Snap-on Inc. Scan tool 20 may further couple to another data processing system or a data network, such as the internet, so that data generated by diagnostic system 10 or scan tool 20 can be transmitted to, or accessed by, other data processing systems.

Figure 2:
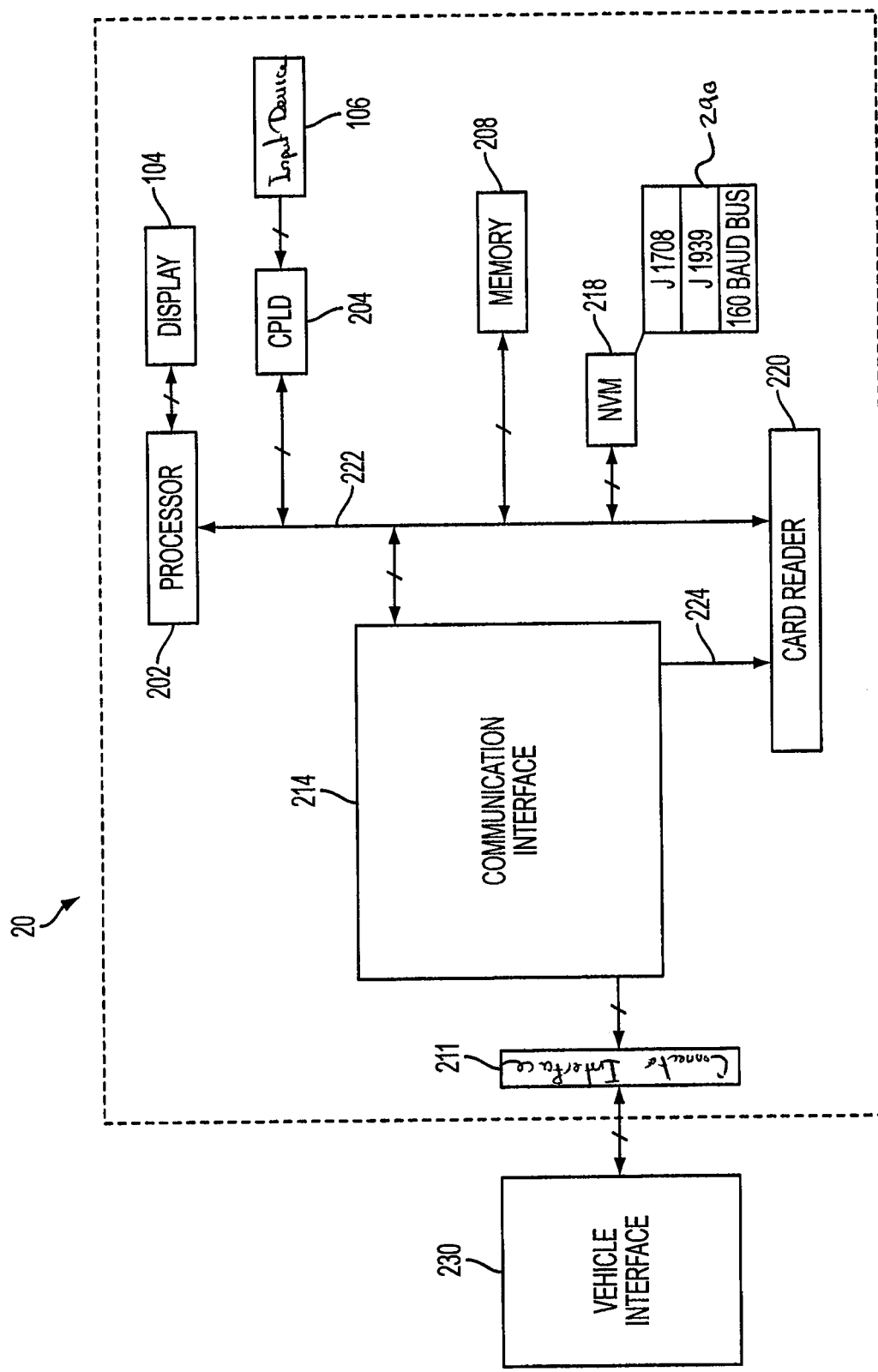
FIG. 2 illustrates a block diagram of an exemplary diagnostic tool in the form of a scan tool.

FIG. 2 is a block diagram of an exemplary diagnostic tool in the form of a scan tool 20. In FIG. 2, diagnostic tool 20 according to an embodiment of the invention includes a processor 202, a communication interface 214, a first system bus 224, a display 104, a complex programmable logic device (CPLD) 204, a user interface in the form of an input device 106, a memory subsystem 208, an internal non-volatile memory 218, a card reader 220, a second system bus 222, and a connector interface 211. A vehicle communication interface 230 is in communication with diagnostic tool 20 through connector interface 211 via an external cable (not shown). The diagnostic tool 20 includes all the components that allow diagnostic tool 20 to function as a scan tool and/or an inspection tool.

Communication interface 214 communicates with the vehicle communication interface 230 through the connector interface 211, using one or more preset communication protocols. Communication interface 214 conditions signals received from an ECU unit through the vehicle communication interface 230 to a conditioned signal compatible with diagnostic tool 20. Communication interface 214 can communicate with multiple communication protocols, such as J1850 (VPM and PWM), ISO 9141-2 signal, communication collision detection (CCD) (e.g., Chrysler collision detection), data communication links (DCL), serial communication interface (SCI), S/F codes, a solenoid drive, J1708, J1939, J1850, RS232, Controller Area Network (CAN), Keyword 2000 (ISO 14230-4), OBD II or other standardized or proprietary communication protocols.

In one embodiment, communication interface 214 implemented using a signal translator which translates and sends in a particular communication protocol based on the control of a selection signal selecting one of multiple communication protocols that communication interface 214 can handle. The signal translator may include multiple circuits; each of the circuit is dedicated to handle signals in one of the preset communication protocols. In another embodiment, the signal translator is implemented using programmable logic arrays that can be reconfigured for a different group of communication protocols.

The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 20 and also provides glue-logic for various other interfacing tasks.

Examples of input device 106 are keypads, mice, touch pads, tracking points, keyboards, touch screen panels, voice recognition systems, or any types of input device that allows a user to input commands to tool 20.

A data storage device, including a memory subsystem 208 and internal non-volatile memory 218, is coupled to the second system bus 222, which allows for communication with the processor 202 and communication interface 214. Memory subsystem 208 can include an application dependent amount of dynamic random access memory (DRAM), a hard drive, and/or read only memory (ROM). Software to run diagnostic tool 20 can be stored in the memory subsystem 208, including any database. The software can be divided into a shared code, an inspection tool code and a scan tool code. The scan tool code and the inspection code are not shared so that if one of the codes is updated, the other code is not affected. The software can also be stored on an external memory, such as a compact flash card or other memories.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for programmable logic array images, if desired. Memory 218 can contain downloadable images so that communication interface 214 can be reconfigured for a different group of communication protocols.

System Operation

In operation, sensors 17 and ECUs 18 on-board the vehicle constantly collect and deliver operation information related to various subsystems of vehicle 11 to data processor 12. In one embodiment, ECUs 1.8 generate and store error codes indicating errors encountered by ECUs 18 and/or their associated subsystems. The operation information and/or error codes are sent to data processor 12 and stored in data storage device 19.

During a diagnostic process, a technician connects scan tool 20 to data port 15, such as a Deutsch connector, to download error codes stored in on-board computer system 10. Scan tool 20 can automatically determine what communication protocols are being used by control units, such as ECUs, on a vehicle and the identities of the control units, and automatically launch proper software applications corresponding to the identified control units. For the purpose of illustration, the following embodiment describes the operation of scan tool 20 capable of communicating using three exemplary communication protocols: J1708, J1939 and 160 Baud, and automatically applies appropriate communication protocols to communicate with ECUs on-board the vehicle and determine their identities. It is understood that a scan tool capable of using more or less than three communication protocols or different combinations of communication protocols may be implemented in a similar manner.

Figure 3:
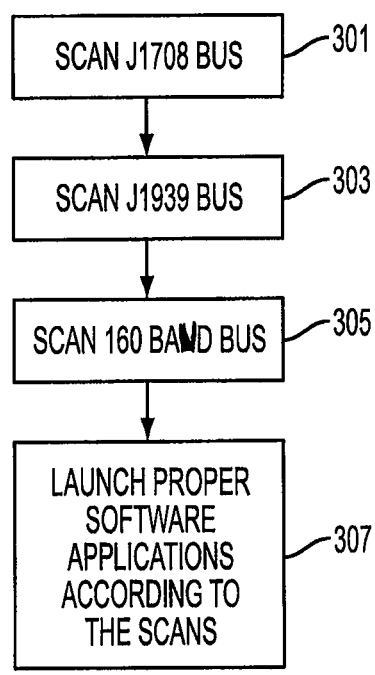
FIG. 3 illustrates a flow chart of scan tool determining whether the vehicle under service includes any control unit using one or more of the three communication protocols: J1708, J1939 and 160 Baud.

FIG. 3 is a flow chart of scan tool 20 determining whether the vehicle under service includes any control unit using one or more of the three communication protocols: J1708, J1939 and 160 Baud. Non-volatile memory 218 maintains a list 290 (shown in FIG. 2) including communication protocols that would be used to determine whether any ECUs on-board the vehicle use any of the communication protocols. This list may be generated using various manners. For example, the list may include all or part of the communication protocols that scan tool 20 is capable of handling. The list may be manually compiled by a user based on the user's preference or types of vehicles most serviced, or based on a preset list provided by the maker of scan tool 20. In the example shown in FIG. 3, list 290 includes three communication protocols: J1708, J1939 and 160 Baud.

Based on list 290, data processor 202 controls scan tool to initiate three communication steps with a vehicle under test. As illustrated in FIG. 3, scan tool 20 performs a scan of J1708 bus (301), a scan of J1939 bus (303) and a scan of 160 baud bus (305). In each scan, scan tool 20 initiates a communication with the vehicle using a specific communication protocol and determines whether a proper response comporting to the specific communication protocol is received from the vehicle. The scan of J1708 bus (301) is described below in more detail with respect to FIG. 4; the scan of J1939 bus (303) is described below in more detail with respect to FIG. 5; and the scan of 160 Baud bus (305) is described below in more detail with respect to FIG. 6.

After initiating communication with the vehicle using one of the communication protocols, scan tool 20 may wait to receive a proper response from ECUs on-board the vehicle. If a proper response is received, scan tool 20 determines that at least one ECU on-board the vehicle uses the specific communication protocol used to initiate communication. The scan tool 20 uses the communication protocol to communicate with the identified ECU. The scan tool 20 may also automatically launch a software application associated with the identified ECU (307). FIG. 7 illustrates an exemplary process for identifying a software application associated with an ECU on-board the vehicle. The software application may be used to collect fault codes, update calibrations or otherwise interact with the ECU.

As noted above, after initiating communication with the vehicle using one of the communication protocols, scan tool 20 may wait to receive a proper response from the ECUs on-board the vehicle. If no proper response is received from the ECUs, scan tool 20 may determine that no ECU on-board the vehicle utilizes the communication protocol used to initiate communication. As a result, the scan may be terminated and a new scan may be performed for the remaining communication protocols on list 290. Alternatively or additionally, upon determination that no ECU on-board the vehicle utilizes the specific communication protocol, scan tool 20 may ask if the user wishes to scan the vehicle for other communication protocols. In yet another variation, scan tool 20 may determine if it includes software applications associated with other communication protocols. If so, scan tool 20 may ask if the user wishes to scan the vehicle for ECUs associated with the other communication protocols. The scan tool 20 may scan the vehicle according to the user's input.

In one implementation, instead of scanning each of the communication buses, scan tool 20 may include an indicator to skip a particular communication bus mentioned on list 290. For example, prior to scanning a communication bus, scan tool 20 may review the available software applications associated with the particular communication bus and if there are no software applications associated with the particular communication bus or the software applications have expired, scan tool 20 may set an indicator to skip scanning the vehicle for that particular bus.

Figure 4A:
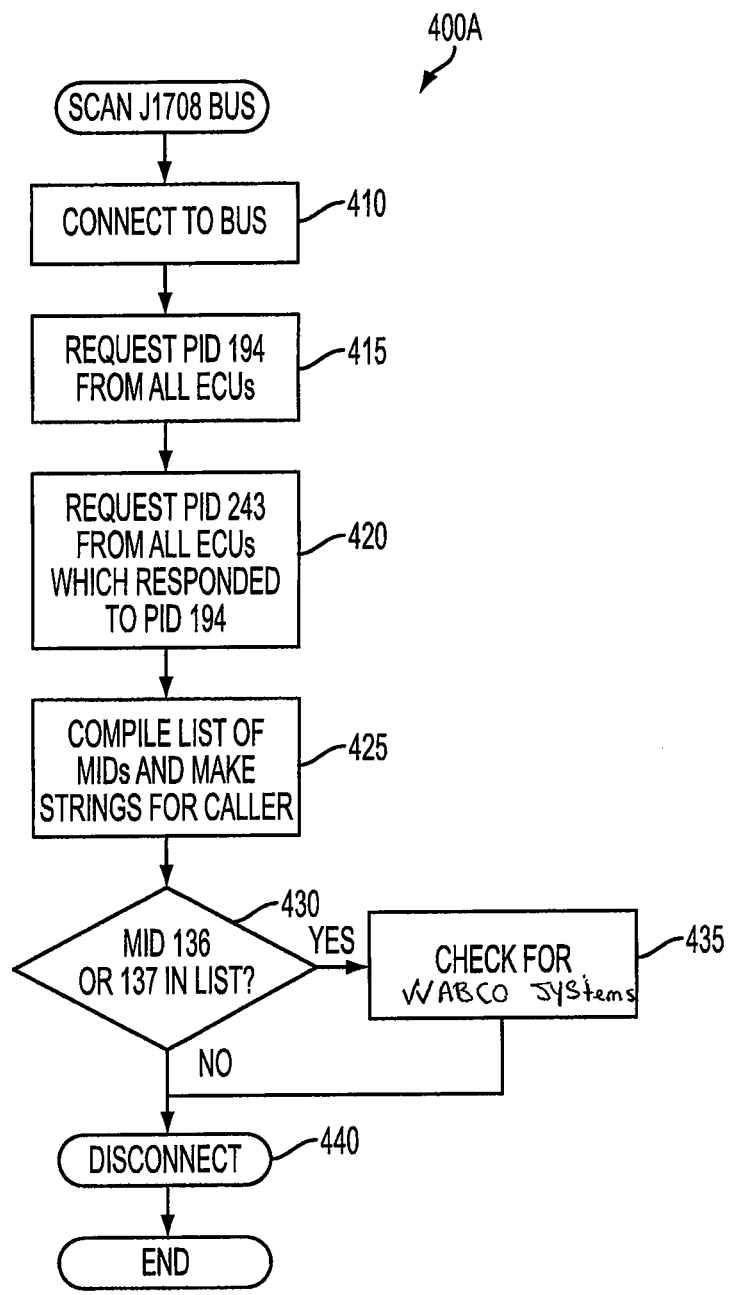
FIG. 4A illustrates an exemplary flow chart showing an operation of a scan of J1708 bus.
Figure 4B:
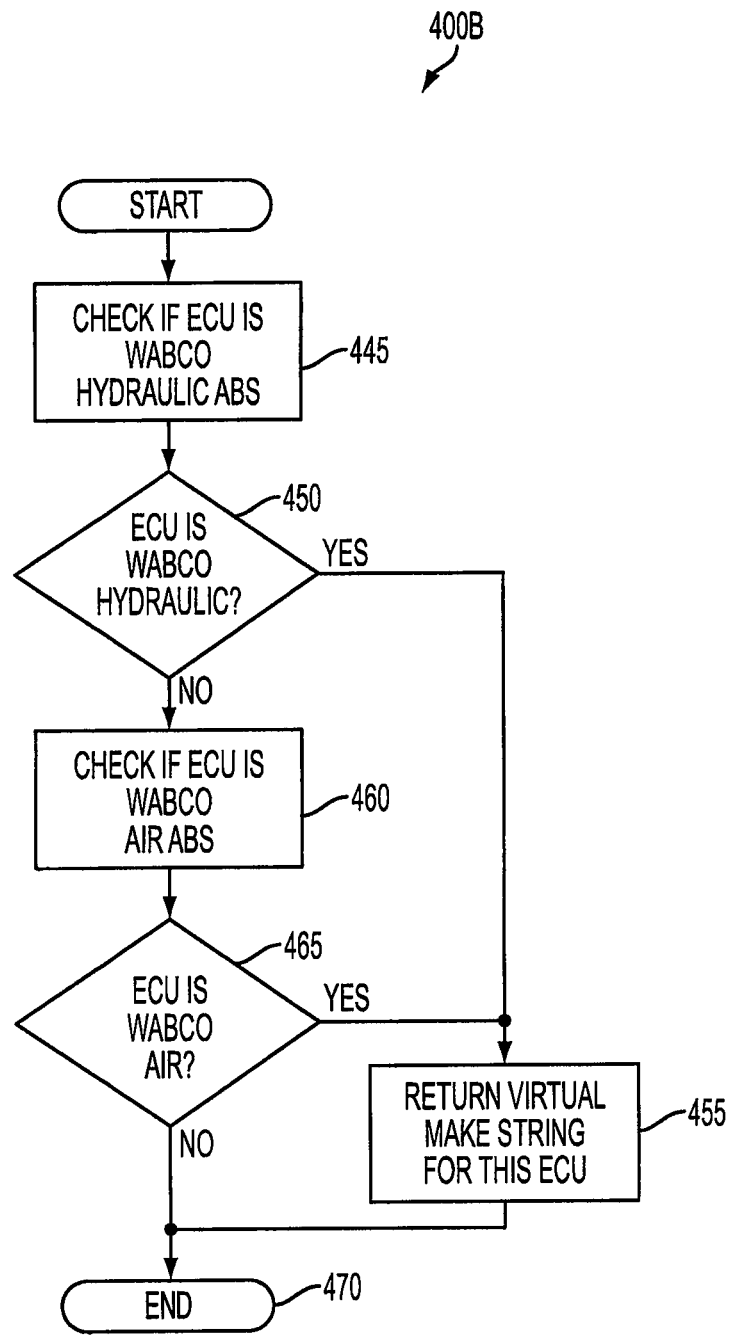
FIG. 4B illustrates an exemplary flow chart for identifying the make and model number of ECUs belonging to WABCO communication system.
Figure 5:
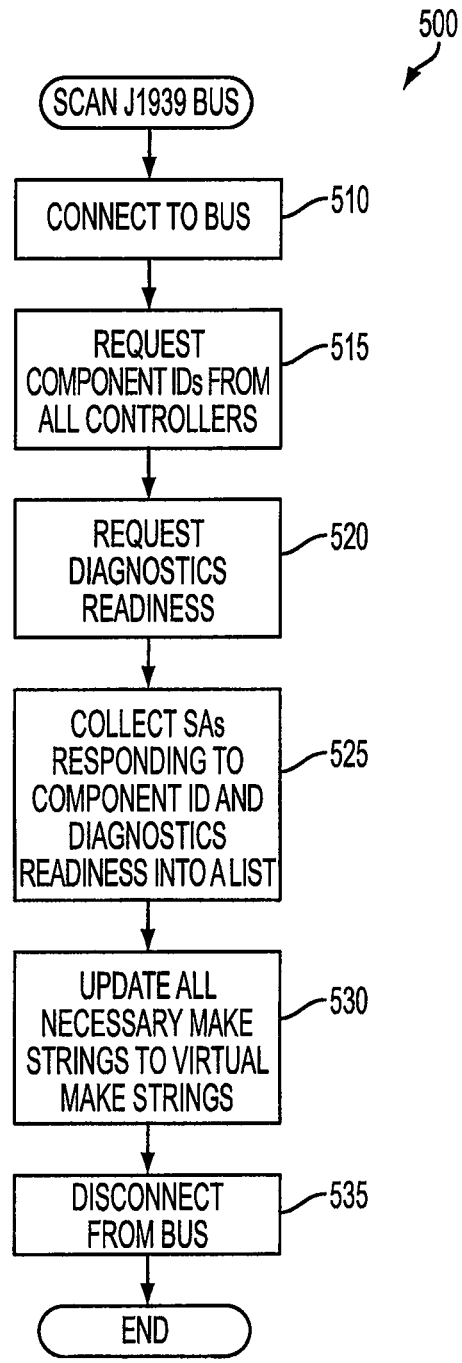
FIG. 5 illustrates an exemplary flow chart showing an operation of a scan of J1939 bus.
Figure 6:
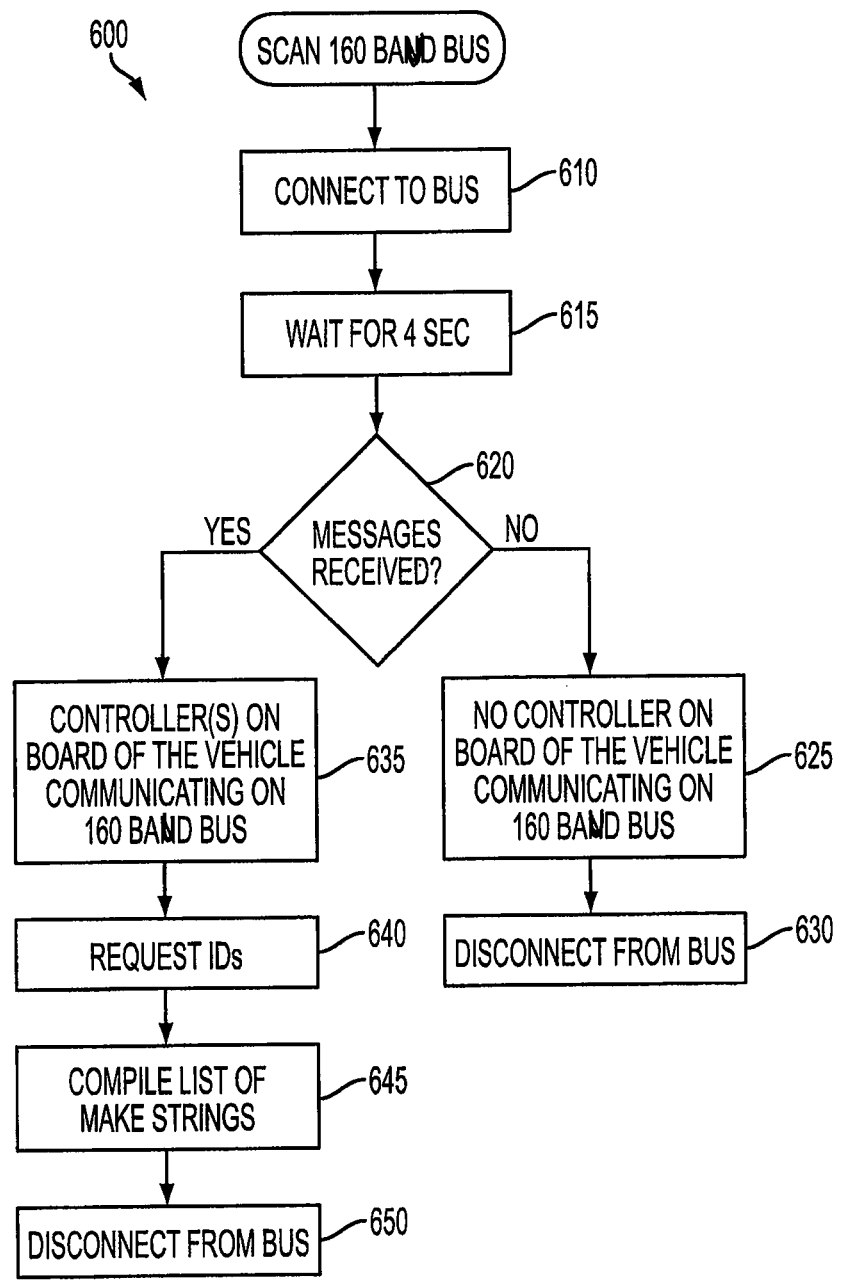
FIG. 6 illustrates an exemplary flow chart showing an operation of a scan of 160 Baud Bus.

Details of the scans for J1708, J1939 and 160 Baud are now described with respect to FIGS. 4-6. FIG. 4A is a detailed flow chart 400A showing an operation of a scan of J1708 bus. The process 400A begins with scan tool 20 connecting to vehicle data port (410). When scan tool 20 connects to the vehicle data port (a Deutsch connector, in this example), a connection driver of scan tool 20 controls the coupling of scan tool 20 to different types of data bus of the vehicle via the vehicle data port. Under the J1708 protocol, each ECU on a J1708 bus is assigned a unique Module Identifier (MID). Once a connection to the J1708 bus is established, scan tool 20 may "listen" for a pre-defined period of time for all MIDs. In this manner, a list of MIDs may be maintained showing ECUs connected to the J1708 bus on-board the vehicle.

Based on the MIDs of the ECUs, scan tool 20 issues a request PID 194 to request fault codes from the identified ECUs (415). Each ECU on-board the vehicle using the J1708 protocol can recognize request PID 194 and send back to scan tool 20 information related to error codes. The scan tool 20 also sends a request PID 243 requesting information related to make and model of ECUs which responded to request PID 194 (420). In response to the request PID 243, ECUs responds with their respective make and model. The make and model of the ECUs may be used to generate a Make String for the ECUs. Alternatively, the MIDs may be used to generate the Make String. The Make String may be used by scan tool 20 to distinguish ECUs from each other and to associate the ECUs with their respective software applications stored in scan tool 20.

The scan tool 20 makes a list of MIDs and Make Strings for the ECUs on-board the vehicle (425). The scan tool 20 may stores the list in its storage device. The storage device may also maintain a list of software applications corresponding to the identified ECUs. By comparing the two lists, scan tool 20 may automatically launch needed software applications corresponding to the identified ECUs using the J1708 communication protocol to process the fault codes and/or perform diagnosis. On the other hand, if, after connection to the J1708 bus, scan tool 20 does not detect any MIDs comporting to the J1708 protocol on the J1708 bus, scan tool 20 determines that the vehicle does not include ECUs comporting to the J1708 standard and disconnects from J1708 bus (440).

Some of the ECUs may return the same MID, making it difficult for scan tool 20 to differentiate them. For example, ECUs corresponding to WABCO communication system may all return the same MID (e.g., MID 136 or 137). Therefore, scan tool 20 may need to further investigate to distinguish these ECUs from each other. According to one implementation, if a MID 136 or 137 is received from a particular ECU on-board the vehicle (430, yes), scan tool 20 checks for WABCO systems to identify the make and model of the ECU (435).

FIG. 4B illustrates an exemplary flow chart 400B for identifying the make and model number of ECUs belonging to WABCO communication system. Process 400B begins with scan tool 20 checking if the ECU is WABCO Hydraulic ABS (445). If the ECU is WABCO Hydraulic ABS (450, yes), scan tool 20 notes the make and model of the ECU and creates a virtual Make String for the ECU (455). Virtual Make Strings may be used to distinguish ECUs having the same or substantially similar Make String. If the ECU is not WABCO Hydraulic ABS (450, no), scan tool 20 checks if ECU is WABCO Air ABS (460). If the ECU is WABCO Air ABS (465, yes), scan tool 20 notes the make and model of the ECU and creates a virtual Make String for the ECU (455). Thereafter, the process 400B ends (470).

In the above-described implementation, scan tool 20 only associates the WABCO ECU with two particular types (e.g., WABCO Hydraulic ABS and WABCO Air ABS). Therefore, the process 400B is only designed to check for these two systems. One of ordinary skill in the art, however, recognizes that scan tool 20 may be modified to check for additional subsystems if necessary.

FIG. 5 illustrates an exemplary flow chart 500 showing an operation of a scan of J1939 bus. The process 500 begins with scan tool 20 establishing a connecting to the J1939 bus on-board the vehicle (510). After scan tool 20 establishes a connection to the J1939 bus, it requests component IDs from ECUs on-board the vehicle (515). In response, ECUs connected to the J1939 bus respond with component IDs and source addresses (SA). The component ID may include information identifying the make and model of the ECU and may be used to generate Make Strings for ECUs.

The scan tool 20 requests diagnostics readiness from the identified ECUs (520). The diagnostic readiness mode indicates whether the ECU supports OBD on the J1939. The scan tool 20 compiles the list of identified ECUs along with their diagnostic readiness into a list (525). In one example, the list includes a list of Make Strings associated with the identified ECUs. If there are multiple ECUs with the same Make String in the list, scan tool 20 may create a virtual Make String for each to distinguish them from each other. The scan tool 20 updates all necessary make strings to virtual Make Strings (530) and updates the list accordingly. Thereafter, scan tool 20 disconnects from J1939 bus (535).

FIG. 6 illustrates an exemplary flow chart 600 showing an operation of a scan of 160 Baud Bus. The process 600 begins with connecting scan tool 20 to the 160 Baud bus (610). After connecting to the 160 Baud bus, scan tool 20 waits for four seconds and determines if any messages are received from the 160 Baud bus (615). If no message is received (620, no), scan tool 20 concludes that there are no ECUs on-board the vehicle that communicate on the 160 Baud bus (625), and scan tool 20 disconnects from the 160 Baud bus (630).

If a message is received (620, yes), scan tool 20 concludes that there are ECU(s) on-board the vehicle that communicate on the 160 Baud bus (635). The scan tool 20 therefore requests identification of the ECUs from which it received the message (640). Upon receiving the ECUs' identifications, scan tool 20 compiles a list of Make Strings for the identified ECUs (645), and scan tool 20 disconnects from the 160 Baud bus (650).

While FIG. 3 shows that the scans for J1708 bus, J1939 bus and 160 baud bus are sequentially performed, it is understood that the scans can be performed in any sequence or order, or even concurrently or in parallel. Similar communications relating to different communication protocols or using different data ports may be implemented in a similar manner.

In one implementation, once the ECUs are identified, scan tool 20 automatically categorizes the identified ECUs and fault codes to pre-defined categories, such as categories based on vehicular sub-systems like engines, brakes, or body controllers, etc., for easy observations and review by the user. According to another implementation, once the fault codes are collected, the information is automatically displayed on a screen, without any intervention by the user. This removes a user's burden to explore between different application software and through layers of menus to find the needed error codes.

After scan tool 20 identifies ECUs on-board the vehicle and collect related error codes, suitable software applications corresponding to the ECUs and/or error codes are launched to perform further analysis and diagnosis. For instance, based on the downloaded error codes, a technician determines what symptoms or problems are encountered by vehicle 11, and what types of errors occurred in which subsystems of vehicle 11. Appropriate analysis and repair can then be performed to pinpoint trouble spots and cure the problem.

Figure 7A:
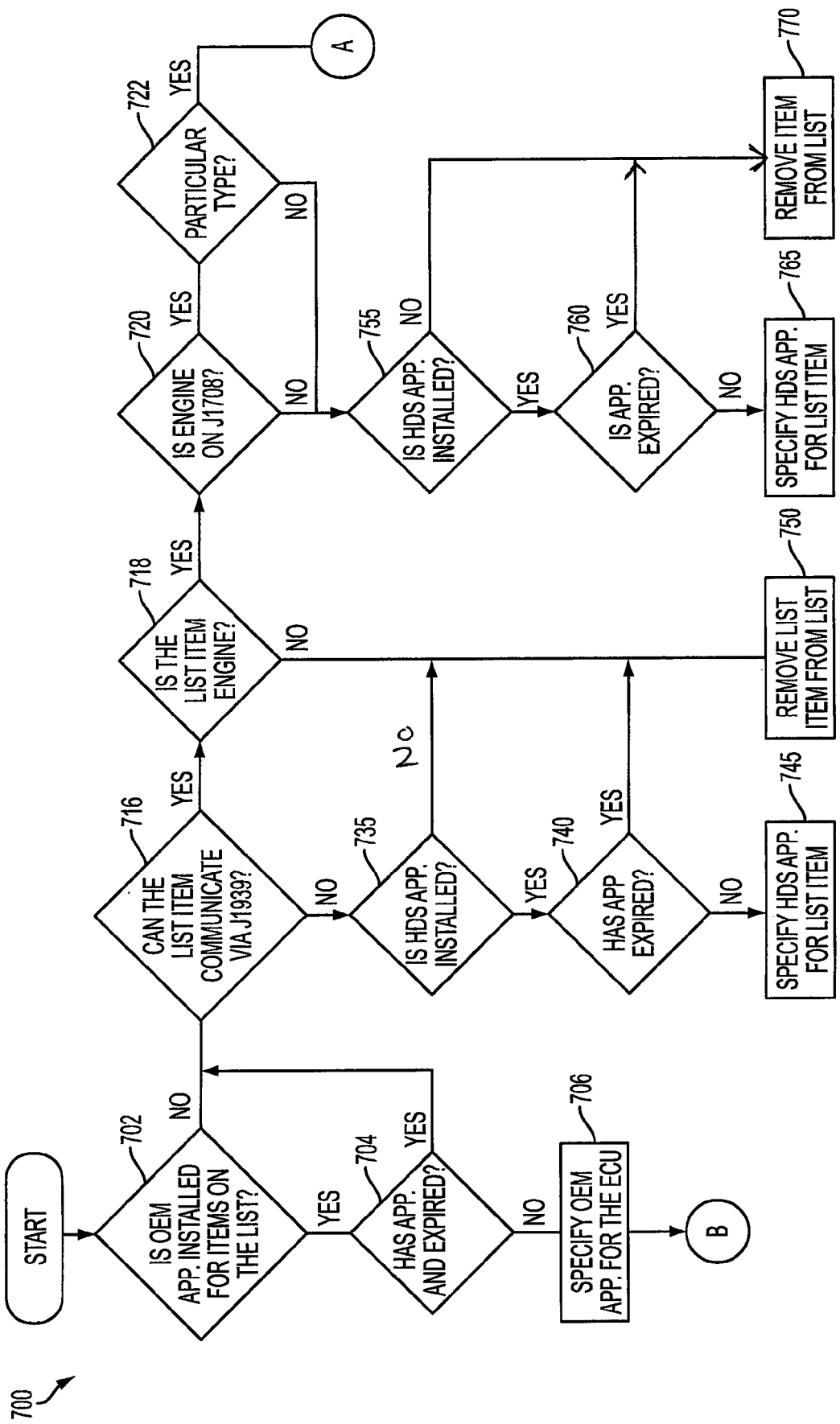
FIGS. 7A-7C illustrate an exemplary flow chart for identifying suitable software applications corresponding to the identified ECUs on-board the vehicle, which can communicate via J1939 and/or J1708 buses.
Figure 7B:
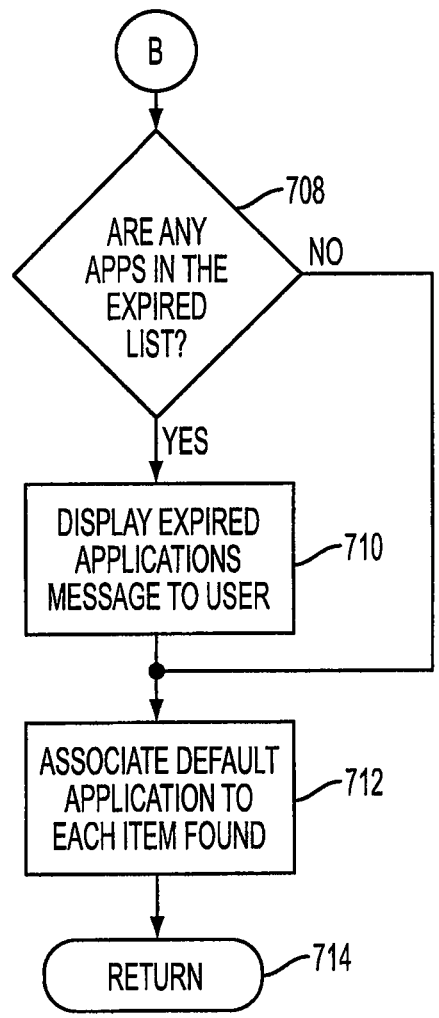
Figure 7C:
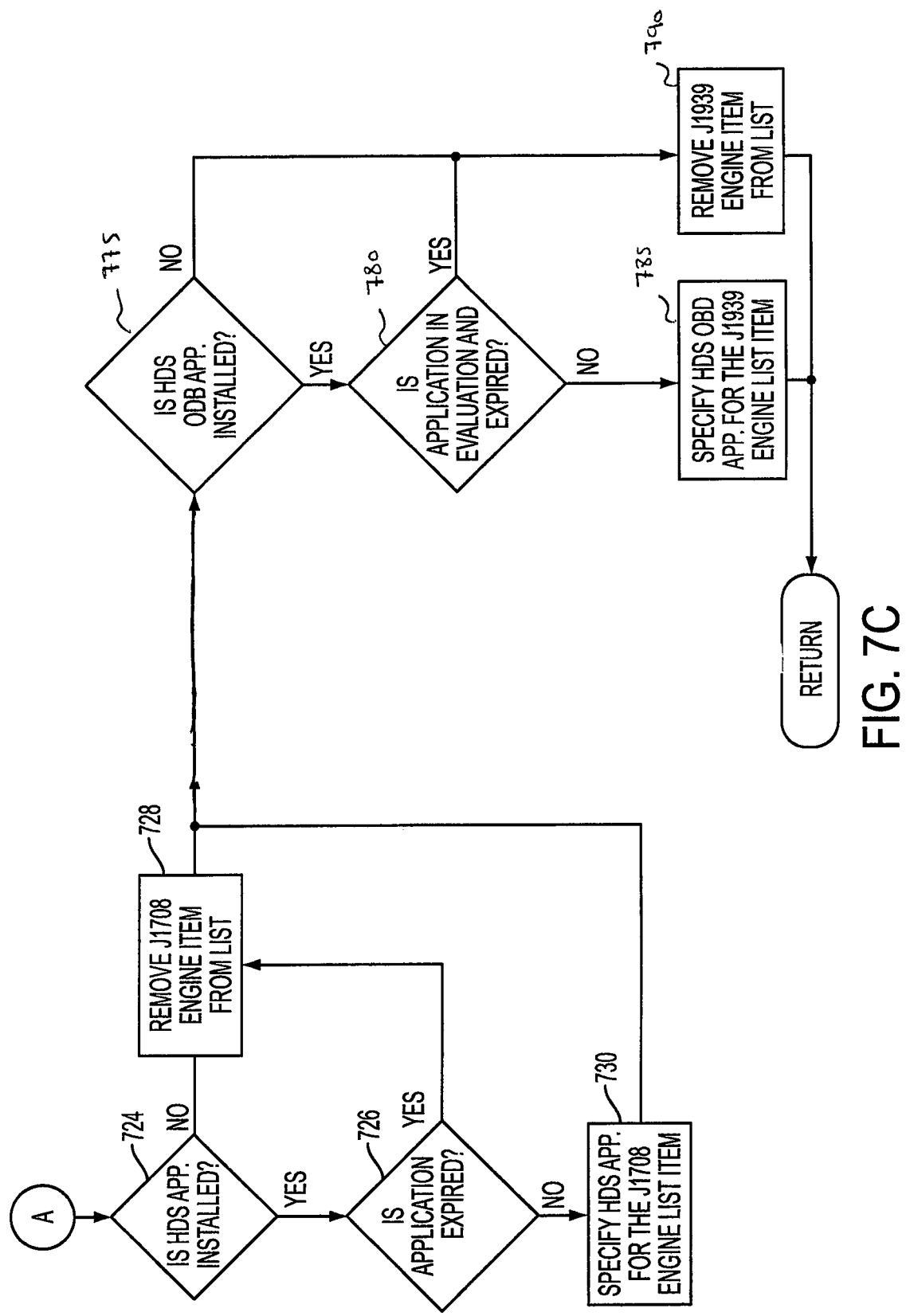

FIGS. 7A-7C illustrates an exemplary flow chart 700 for identifying suitable software applications corresponding to the identified ECUs on-board the vehicle, which can communicate via J1939 and/or J1708 buses. The process 700 begins with scan tool 20 determining OEM applications for each of the ECUs on the list (702). For example, scan tool 20 may start with the first ECU on the list and continue its work downward. To this end, scan tool 20 may determine the OEM applications associated with the first ECU. If there are OEM applications associated with the first ECU (702, yes), scan tool 20 then determines if the associative applications have expired (704).

In one implementation, scan tool 20 may include application in evaluation mode. In the evaluation mode, the application may be fully functional but may only be used a limited number of times. Once the limited number of usage for the application is exhausted, scan tool 20 may flag the application as expired. As such, additional usage may be prevented and the user of scan tool 20 may be required to subscribe and pay for the additional usage.

Figure 8:
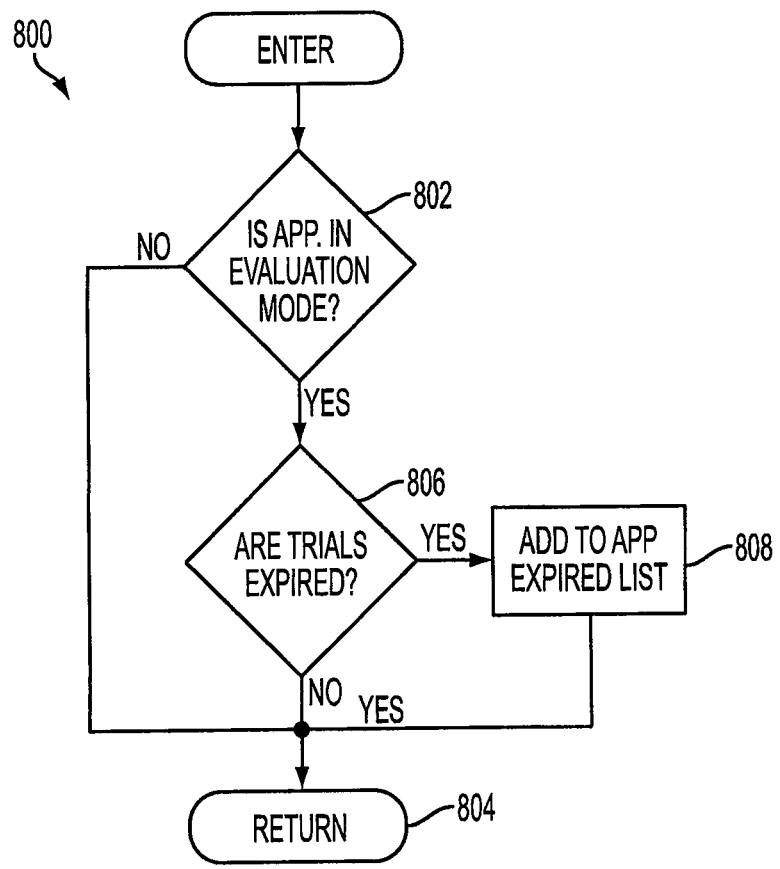
FIG. 8 illustrates an exemplary flow chart for determining whether an application has expired.

To illustrate further, FIG. 8 illustrates an exemplary flow chart 800 for determining whether an application has expired. The process 800 begins with scan tool 20 determining if the application is in evaluation mode (802). As noted above, the application may be in evaluation mode if it is allowed to be used only certain number of trials. If the application is not in evaluation mode (802, no), scan tool 20 may recognize that the application has not expired and therefore may resume process 700 (804). If the application is in evaluation mode (802, yes), scan tool 20 determines if the trials have expired (806). In particular, scan tool 20 determines if the user has used all the allowable number of trials for this particular application. If yes (806, yes), scan tool 20 adds the application to the list of expired applications (808) and returns to the process 700 (804). Otherwise (806, no), scan tool 20 determines that the user has not exceed the limited usage threshold, considers the application as not expired, and returns to the process 700 (804).

Assuming scan tool 20 determines that the application has not expired (704, no), scan tool 20 specifies the application for the first ECU (706). In particular, scan tool 20 associates the application with the first ECU. Thereafter, scan tool 20 may automatically load the application to perform diagnosis or download information from first ECU. Alternatively or additionally, instead of automatically loading the application, scan tool 20 may present this application to the user as one of the application that can be used to interact with the first ECU and may solicit input from the user as to whether load this application. If the user selects the application, the application will be loaded to perform diagnosis or download information from first ECU. If the user does not select the application, the application will not be loaded.

In one implementation, scan tool 20 may also determine if there are expired applications associated with the first ECU on the list (708). If yes (708, yes), scan tool 20 may display expired applications to the user (710) and associate default application to each expired application (712). The default applications may be presented to the user for selection. In this scenario, even though the user may not be able to utilize the expired application without further subscription and/or payment, the user can instead use the default applications to perform diagnosis or download information from first ECU. The default applications may also be used to correct the default codes but may not provide the enhanced user experience as the expired applications.

The process 700 then returns to the step 702 (714), where the above process is performed for the remaining ECUs on the list. If there are no expired applications associated with the first ECU (708, no), scan tool 20 may still present the default applications associated with the first ECU to the user for selection (712) and may then return to step 702. At step 702, scan tool 20 again determines if it includes additional OEM application associated with the first ECU on the list. If no additional OEM application is present for the first ECU on the list, scan tool 20 moves to the next item on the list. The scan tool 20 determines if it includes an OEM application for the next item on the list (702). If not (702, no) or if scan tool 20 includes the OEM application but the OEM application has expired (704, yes), scan tool 20 determines if the list item can communicate via the J1939 bus (716).

In one specific implementation, scan tool 20 may identify engines that can communicate on both buses J1939 and J1708 bus. To this end, if the list item communicates via the J1939 bus (716, yes), scan tool 20 also checks check to see if the list item is an engine (718) and communicates on J1708 bus (720). If yes (718, 720, yes), scan tool 20 may determine whether the engine is a particular type of engine (722). For example, scan tool 20 may check if the engine is a CAT Accert 07 or greater. If the engine is the particular type of engine (722, yes), scan tool 20 may load a Heavy Duty Standard ("HDS") application for a J1939 and a HDS application for a J1708 bus.

To this end, scan tool 20 may determine if it includes a HDS application for J1708 (724). If yes (724, yes), scan tool 20 determines if the HDS application has expired (726). The scan tool 20 may use the process 800 to determine whether the HDS application has expired. If the HDS application has not expired (726, no), scan tool 20 specifies the application for the list item on the list (730). For example, scan tool 20 may present the HDS application to the user as one of the applications that can perform diagnosis or may download information from engine. In this manner, a HDS application is associated with the engine communicating on the J1708 bus. If the HDS application has expired (726, yes), scan tool 20 removes the list item from among the items on the list (728). This may indicate to scan tool 20 that there are no remaining applications associated with this list item and as such it should be removed from among the items on the list.

The scan tool 20 may then determine if it includes a HDS application for J1939 (775). If yes (775, yes), scan tool 20 determines if the HDS application has expired (780). The scan tool 20 may use the process 800 to determine whether the HDS application has expired. If the HDS application has not expired (780, no), scan tool 20 specifies the application for the list item on the list (785). For example, scan tool 20 may present the HDS application to the user as one of the applications that can perform diagnosis or may download information from engine. In this manner, a HDS application is associated with the engine communicating on the J1939 bus. If the HDS application has expired (780, yes), scan tool 20 removes the list item from among the items on the list (790). This may indicate to scan tool 20 that there are no remaining applications associated with this list item and as such it should be removed from among the items on the list.

If scan tool 20 determines that the list item does not communicate on J1939 bus (716, no), the scan tool 20 may conclude that the list item belongs to the J1708 communication protocol and may determine if there is a HDS application installed for the list item that can communicate on the J1708 bus (735). If yes (735, yes), scan tool 20 determines if the HDS application has expired (740). If not (740, no), scan tool 20 specifies the HDS application for this list item (745).

If the HDS application has expired (740, yes) or there are no HDS application associated with the list item communicating on the J1708 bus (735, no), scan tool 20 removes the list item from among the items on the list (750). This may indicate to scan tool 20 that there are no applications associated with this list item communicating on the J1708 bus and as such the list item should be removed from among the items on the list.

If scan tool 20 determines that the list item is an engine but it does not communicate on the J1708 bus (720, no) or if that the list item is not of a particular type (722, no), scan tool 20 determines if there is a HDS application installed for the list item (755). Under this scenario, scan tool 20 recognizes that the list item can communicate via the J1939 bus but not via the J1708 bus. Therefore, scan tool 20 searches for HDS applications associated with J1939 communication bus. If there is a HDS application for this particular communication bus (755, yes), scan tool 20 determines whether the HDS application has expired (760). If not (760, no), scan tool 20 specifies the HDS application for the list item (765). If no HDS application is installed for this list item (755, no) or if the HDS application has expired (760, yes), scan tool 20 removes the list item which communicates on the J1939 bus from the list (770). This may indicate to scan tool 20 that there are no applications associated with this list item communicating on the J1708 bus and as such the list item should be removed from among the items on the list.

In one implementation, scan tool 20 when activated displays a user interface including several buttons that enable the user to navigate the functionality of scan tool 20. The buttons may include "Scan Vehicle" button, "Manual Load" button, "Play Recording" button, "Admin" button, and "Demo Mode" button, etc. The "Scan Vehicle" button, when activated, directs scan tool 20 to scan the vehicle and load related vehicle applications automatically. The "Manual Load" button, when activated, directs scan tool 20 to scan the vehicle and allows the user to select the ECU and vehicle application for loading. The "Playing Recording" button, when activated, directs scan tool 20 to load and play a recording file. The "Admin" button, when activated, launched the Admin program. The "Demo Mode" button, when activated, directs scan tool 20 to simulate a live connection to a vehicle for the user.

In operation, scan tool 20 may be used in two modes: an automatic mode and a manual mode. The automatic mode performs detection of ECUs on-board the vehicle and associates the appropriate vehicle applications with detected ECUs automatically. The manual mode may perform the detection of ECUs on-board the vehicle automatically but may associate the appropriate vehicle applications with the detected ECUs manually. For example, a list of suggested software applications suitable to or usable with the detected ECUs may be displayed to the user to solicit selection from the user. Upon selection, the selected application may be launched on scan tool 20. The scan tool 20 may use one or more of the processes described with respect to FIGS. 3-8 to implement the automatic and manual mode.

Automatic mode may be entered automatically when the scan tool 20 is started. In the event that scan tool 20 is running in manual mode and it is necessary to return to automatic mode, the user can either reboot scan tool 20 or perform the following steps (i) select the "Admin" button; (ii) select the "Scan Vehicle" button; and (iii) select the "Auto" button on the "Scan Mode" dialog resulting from the selection of the "Scan Vehicle" button.

Figure 9:
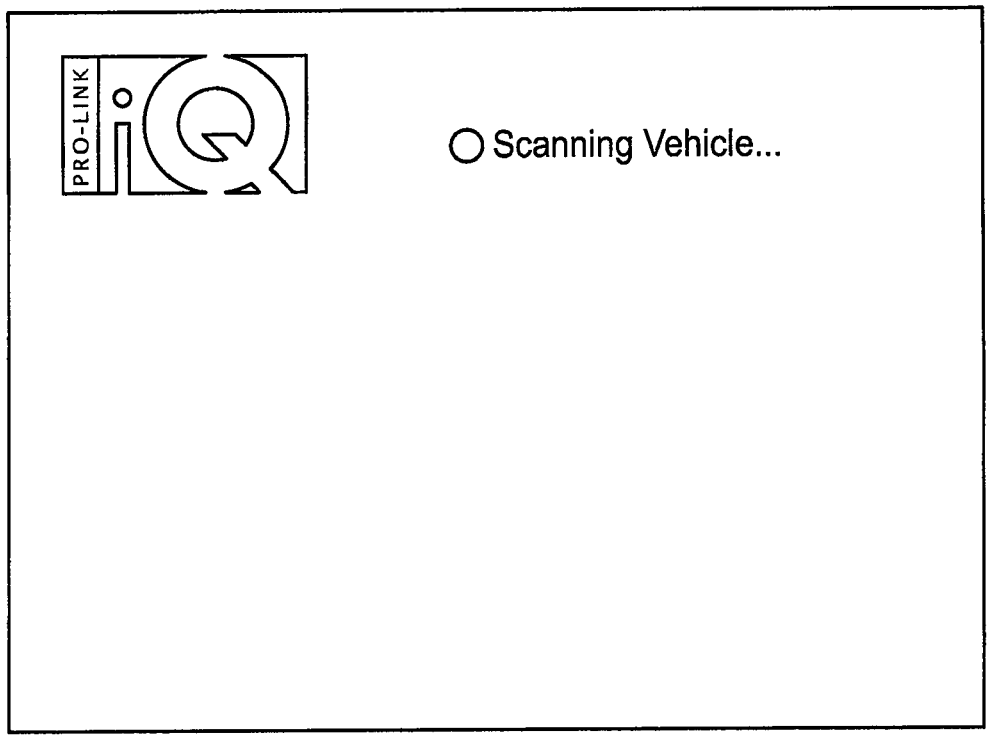
FIG. 9 illustrates an exemplary user interface showing that a vehicle scan is in progress.
Figure 10:
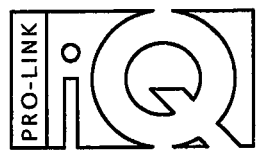
FIG. 10 illustrates an exemplary user interface showing that a vehicle scan has been completed.

The application checks for a vehicle connection when launched. If a vehicle connection is found, scan tool 20 automatically scans the vehicle and attempts to identify available ECUs. The scan tool 20 may convey to the user that scan is in progress. For example, as shown in FIG. 9, "Scanning Vehicle . . . " LED flashes yellow to indicate that a scan is in progress. If the vehicle scan is successful, the "Vehicle Scanned" LED becomes solid green and a description of each identified ECU is listed as shown in FIG. 10.

The description includes the name of the ECU followed by the name of the vehicle application that is used to communicate with the ECU. In this scenario, the ECU includes Engine #1 and the software application includes HDS application. Following a successful scan of the ECUs on-board the vehicle, the software application attempts to scan the fault codes of each ECU in the list. As a result, the "Scanning for Faults" LED flashes yellow to indicate that a scanning for fault is in progress.

Figure 11:
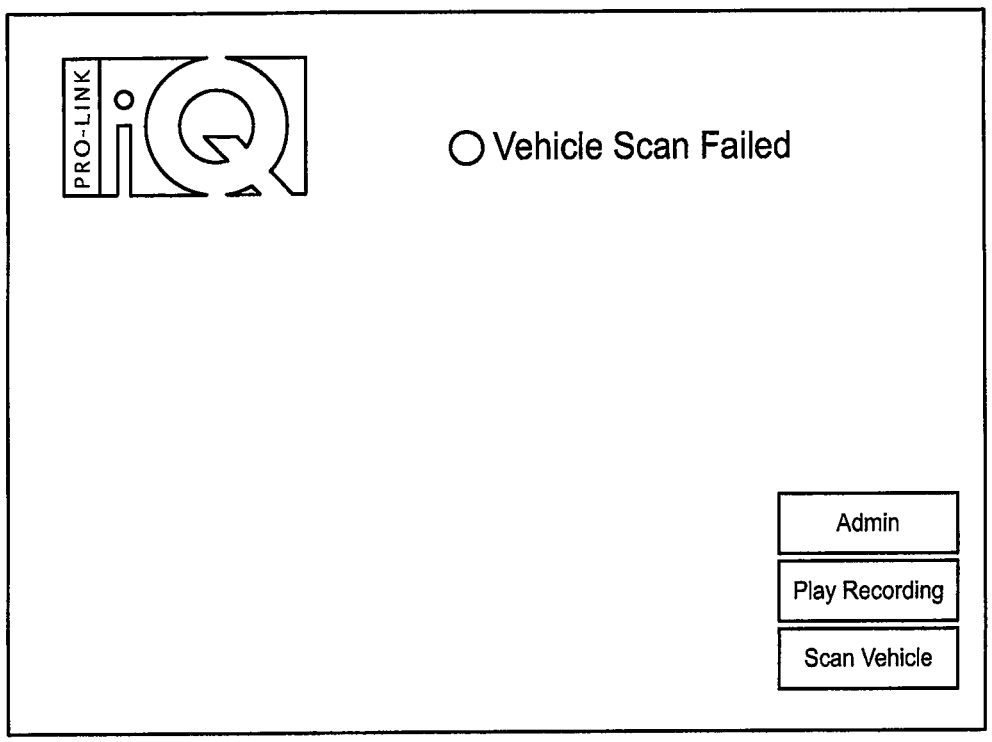
FIG. 11 illustrates an exemplary user interface showing that a vehicle scan has failed.
Figure 12:
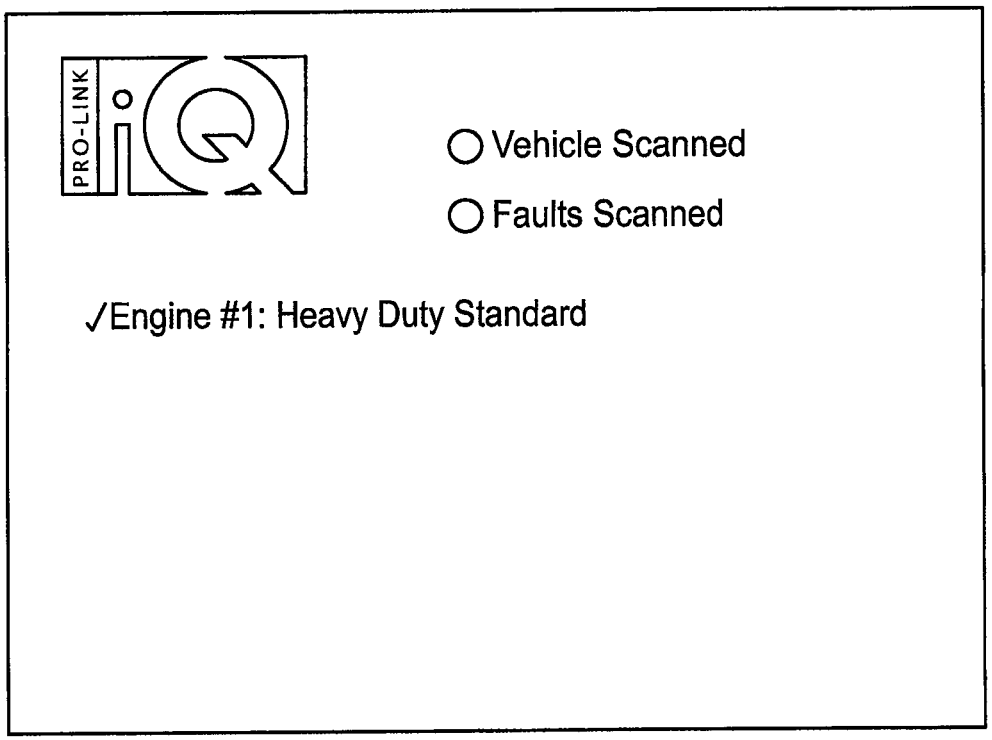
FIG. 12 illustrates an exemplary user interface showing that fault codes of an ECU have been scanned successfully.

If the vehicle scan is unsuccessful, the "Vehicle Scanned" LED becomes solid red and an error message is displayed. For example, the message may indicate that "Vehicle Scan Failed" as shown in FIG. 11. If the faults of an ECU are scanned successfully, a checkmark may appear next to the ECU in the list as shown in FIG. 12.

In another implementation, instead of automatically identifying modules on-board the vehicle and associating a particular application therewith, scan tool may manually perform this task. The automatic identification of the modules on-board the vehicle may still be carried out in the manual mode. Manual mode, however, may give the user limited control of the vehicle application and the ECU for which it is loaded. Manual mode supports the selection of a single vehicle application and module.

Manual mode can be entered using two different methods. The first method is by means of the Admin application. To enter manual mode by using the Admin application, the user may (i) select the "Admin" button, (ii) select the "Scan Vehicle" button; and (iii) select the "Manual" button on the scan mode dialog. The second method for entering manual mode is by means of a command line. The command line may receive an input from the user which may be executed to launch manual mode.

The manual load process is initiated by launching the application in manual mode while connected to a vehicle or by selecting the "Manual Load" button on the scan screen. Similar to the automatic mode, the "Scanning Vehicle" LED flashes yellow while the vehicle scan is running to show the user that the scan is in progress. Once scan tool 20 has automatically identified the ECUs on-board the vehicle, the "Scanning Vehicle" LED may become solid green and the manual load dialog may be displayed. If scan tool 20 fails to identify ECUs on-board the vehicle, the "Scanning Vehicle" LED may become solid red and an error message may be displayed.

Figure 13:
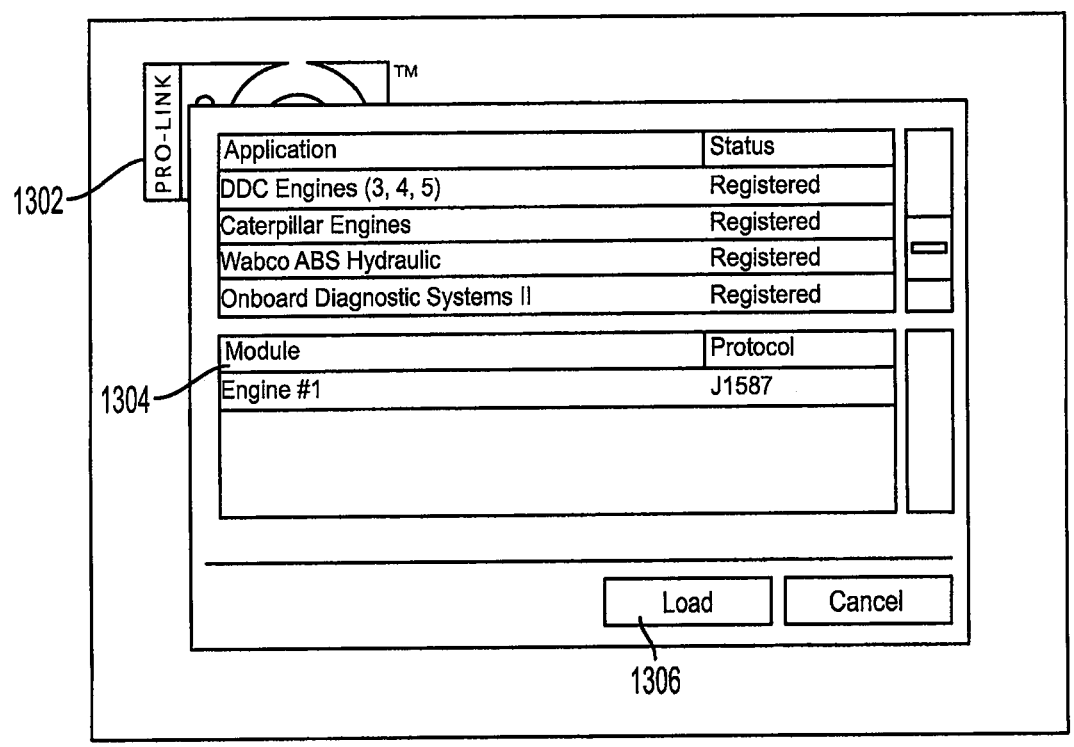
FIG. 13 illustrates that exemplary user interface showing that a manual load dialog contain two lists.

FIG. 13 illustrates that a manual load dialog contain two lists 1302, 1304. The top list 1302 displays the vehicle applications installed on scan tool 20. In one aspect, the registered and evaluation applications are selectable, while expired applications are not selectable from list 1302. The bottom list 1304 displays ECUs detected on the bus by scan tool 20. The ECUs in the list may be disabled by default. When a vehicle application is selected, supported ECUs are enabled. To perform a manual load, in one example, the user selects the application to load, the module to which the vehicle application will connect, and the load button 1306.

The "Scanning Faults" LED may flash yellow while the application is attempting to register the selected vehicle application for the selected module. If the vehicle application is loaded successfully, the "Scanning Faults" LED may become solid green and the application may transition to the main screen. If the vehicle application fails to load, the "Scanning Faults" LED may become solid red and the scan screen may return to its default state.

Figure 14:
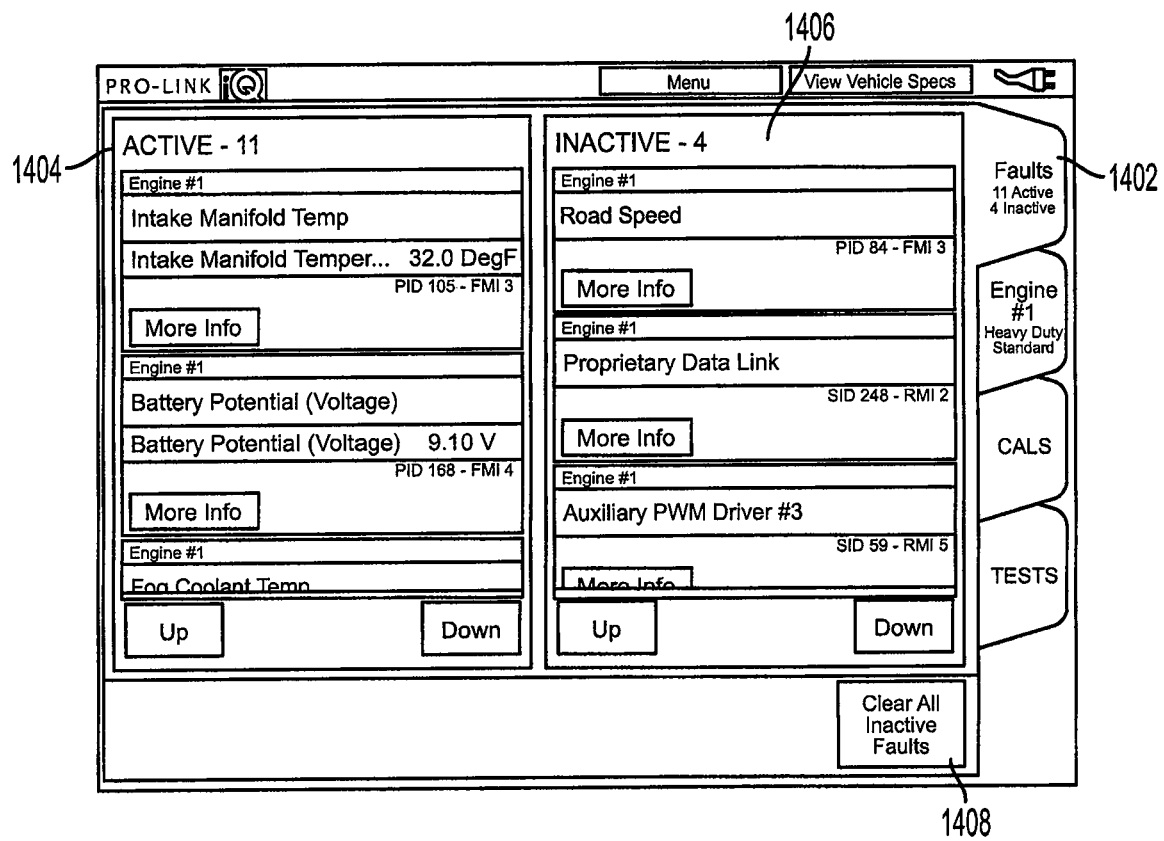
FIG. 14 illustrates exemplary fault codes detected on-board the vehicle.

FIG. 14 illustrates exemplary fault codes detected on-board the vehicle. As shown, the fault codes are shown under a fault tab 1402 and are separated into two lists: an active list 1404 for displaying active faults and an inactive list 1406 for displaying inactive faults. The heading of each list 1404, 1406 contains the number of faults in the list. Each item in the list may contain important information about a particular fault.

If any faults are detected on-board the vehicle, they will be represented by a fault item in one of the fault lists 1404, 1406. The first row of the fault item contains the name of the module that the fault belongs to. The second row contains a description of the fault. The third row contains any parameter information associated with the fault. The last row contains OEM information about the fault. Faults capable of displaying additional information may contain a "More Info" button.

Inactive faults may be cleared by selecting the "Clear All Inactive Faults" button 1408. Clearing all faults at once may not be supported by all ECUs. If none of the detected ECUs support this functionality, the "Clear All Inactive Faults" button may not appear. If a module does not support clearing all faults, its fault items will display a "Clear" button that allows the faults to be cleared individually.

Figure 15:
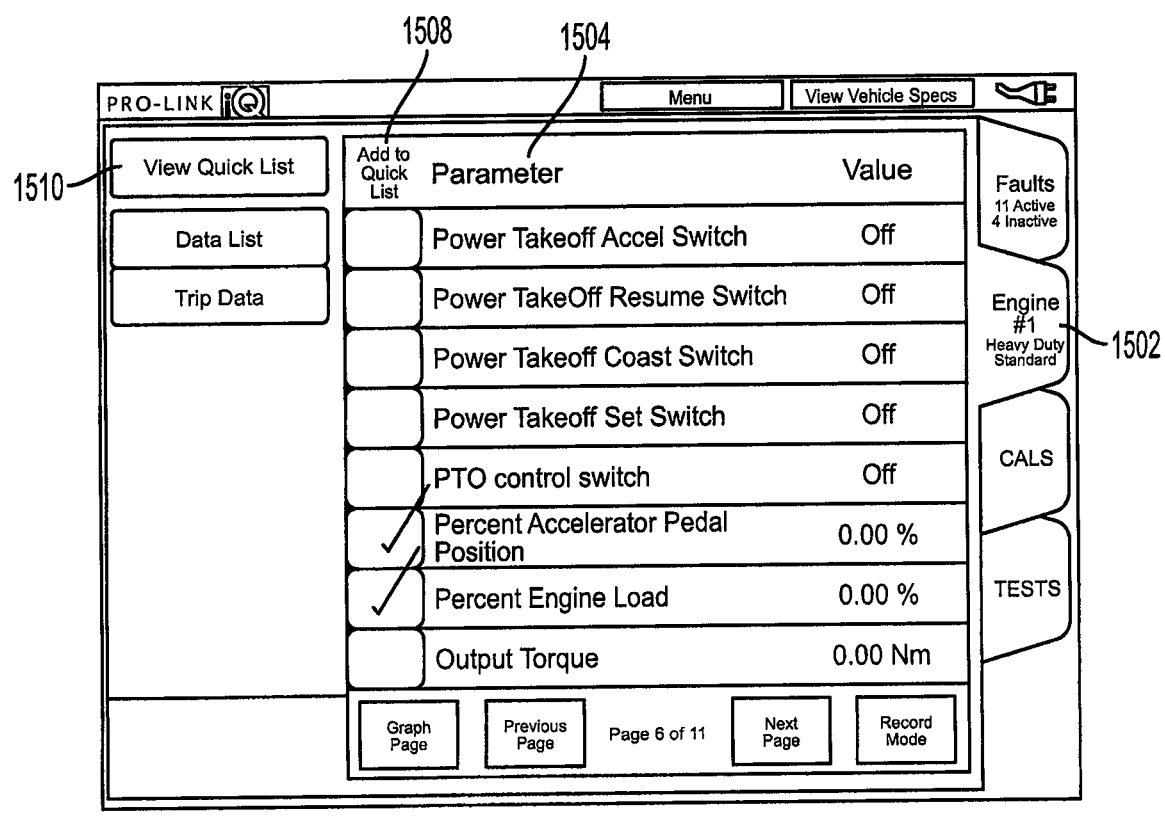
FIG. 15 illustrates an exemplary parameters tab that is created for modules detected on-board the vehicle and that supports viewing parameters.

FIG. 15 illustrates an exemplary parameters tab that is created for each module detected on-board the vehicle and that supports viewing parameters. A parameters tab 1502 contains the name of the ECU followed by the name of the vehicle application used to communicate with the ECU. In this scenario, the parameter tab includes the Engine 1 and the HDS application to communicate with Engine 1.

Once the parameters tab 1502 is selected, the user may be prompted to select a category. Once one of these categories is selected, a list of the parameters 1504 within that category is displayed. The parameter tab 1502 also includes a quick list 1508 which may be displayed by selecting a view quick list button 1510. The quick list 1508 is a place for storing parameters across different categories and even across different ECUs. Because of this flexibility, it may be useful for diagnosing problems with a vehicle. To add parameters to the quick list 1508, the user may select a parameter within the parameter list. A checkmark may appear next to the parameter to indicate that it has been added to the quick list 1508.

The view quick list button 1510 updates to display the number of parameters in the quick list 1508. If no parameters have been added to the quick list 1508, a message informs the user of the steps required to add parameters to the quick list 1508. One or more parameters can be removed from the quick list 1508 by viewing the quick list 1508, selecting the parameters to remove, and then selecting the "Remove Selected Items" button (not shown). To remove all parameters from the quick list 1508, the user may select, for example, "Clear Quick List" button (not shown).

Figure 16A:
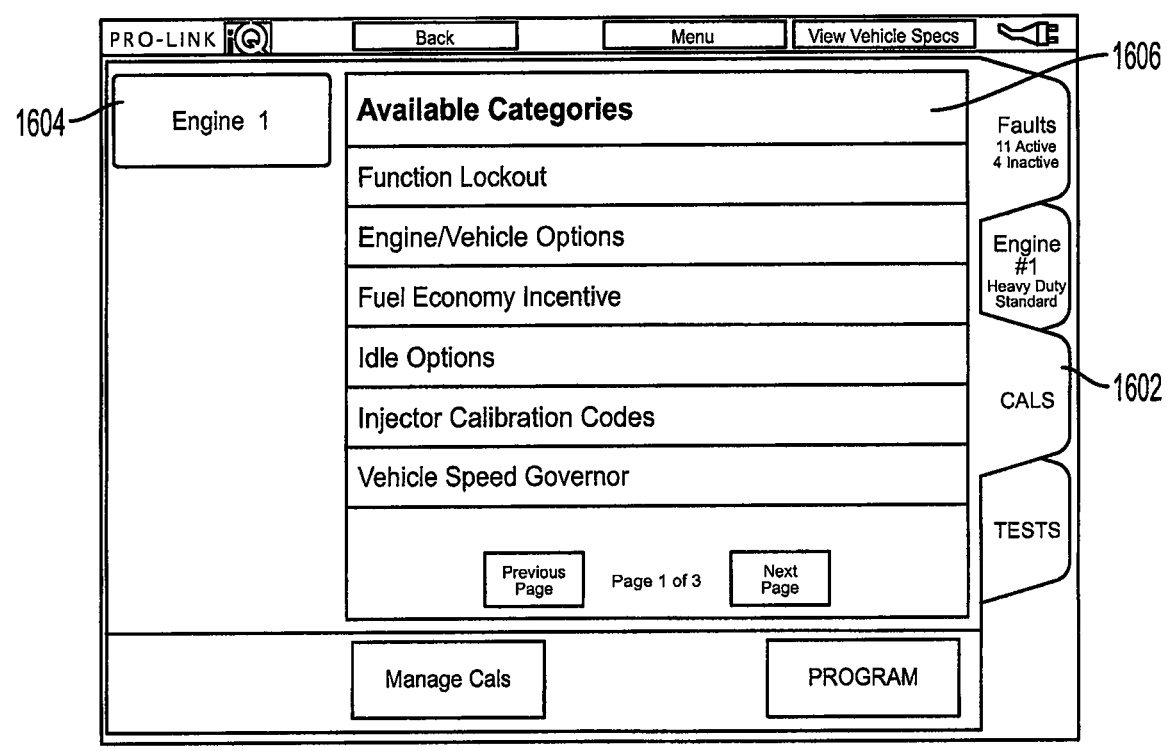
FIG. 16A-16B illustrate an exemplary calibration tab, listing calibrations available for ECUs on-board the vehicle.
Figure 16B:
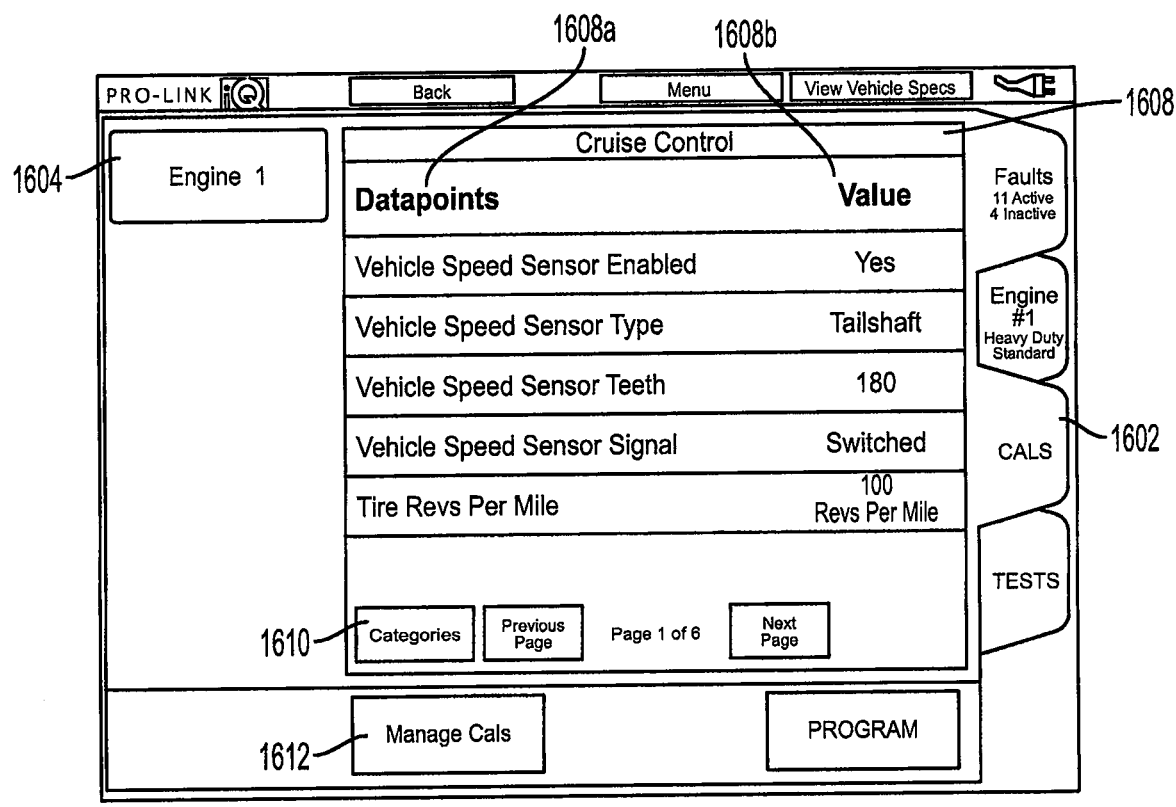

FIGS. 16A-16B illustrate an exemplary calibration tab, listing calibrations available for ECUs on-board the vehicle. The first time the calibrations tab 1602 is selected, a message in the calibration list area may instruct the user to select an ECU. For example, the message may indicate "To view calibrations, please select an ECU." In response, the user may select an engine 1604, which may result in the display of available calibration categories 1606. A calibration category is a collection of related calibrations.

Each ECU may contain zero or more calibration categories. Each calibration category may contain one or more calibration data points. A calibration data point may identify a specific calibration to run on the ECU and may be displayed by selecting a particular calibration category. In response, the available calibration categories list 1606 will change to a data point list 1608 that displays the available calibration data points.

The data point list 1608 contains 2 columns: the data point column 1608*a* and a value column 1608*b*. The data point column 1608*a* displays a descriptive name of the calibration. The value column 1608*b* displays the current value of the calibration. The value displayed for a data point item will change to reflect changes made during the calibration. Some ECUs require batch programming of the calibrations. In this case, a "Program" button may be displayed in the calibrations tab and may be selected to send the updated calibration values to the ECU. To return to the category view, categories button 1610 may be selected.

To view a calibration screen, a user may select a particular calibration data point from among the calibration data point list 1608. Each calibration screen is unique to the type of ECU and type of test being performed; however, most calibration screens display some common elements. The common elements include: the title of the calibration across the top of the screen, an "Update" button, and a "Close" or "Cancel" button. While a calibration is running, the calibrations tab 1602 may be locked and the buttons on the title bar may be disabled.

Some vehicle applications support the ability to save calibration settings to a file. Once a calibrations file has been created, it can be previewed, loaded onto a compatible vehicle, or deleted. All functionality for interacting with a calibration file is provided by the calibrations manager screen, which may be access through manage calibration button 1612. In one implementation, the application allows ten calibration files to be saved per vehicle application. If ten calibration files currently exist for the vehicle application, one or more files may be deleted before saving a new one. To save a calibration file, the user can select the "Save" button in the calibration manger screen. After the calibration file is saved it will appear in the list of saved calibrations.

The settings stored in a calibration file can be previewed before being loaded into a compatible ECU. Loading a calibration file is the process of loading the settings stored in the file into an ECU on-board the vehicle. To load a calibration file, the following steps may be performed: (i) select the calibration file to load, (ii) select the "Load" button, (iii) select the "Yes" button when prompted to confirm the load action; and (iv) enter the correct password when prompted and if necessary. A status box may be displayed while the calibration settings are loaded. When loading is complete, the results of the operation are displayed.

When a calibration file is no longer required it can be deleted from the system. To delete a calibration file, the following steps may be performed: (i) selecting the calibration file to delete, (ii) selecting the "Delete" button, and (iii) selecting the "Yes" button when prompted to confirm the delete action.

Figure 17A:
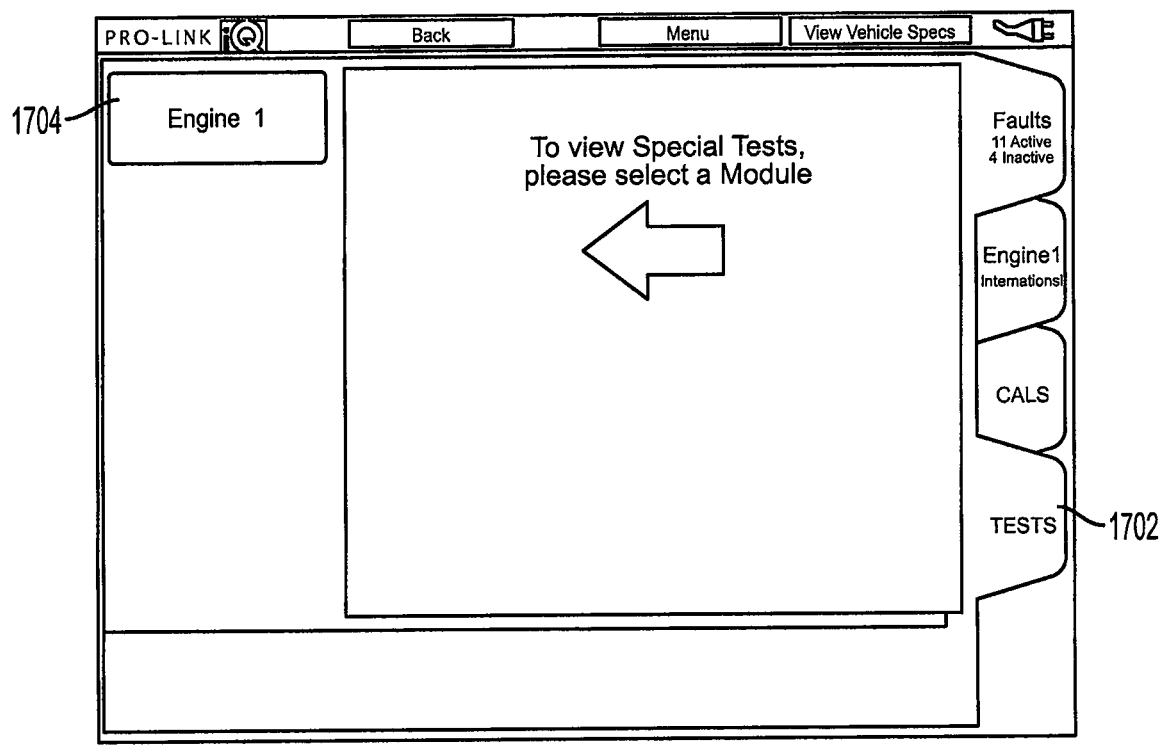
FIGS. 17A-17B illustrates an exemplary test tab 1702, listing the special tests available for ECUs on-board the vehicle.
Figure 17B:
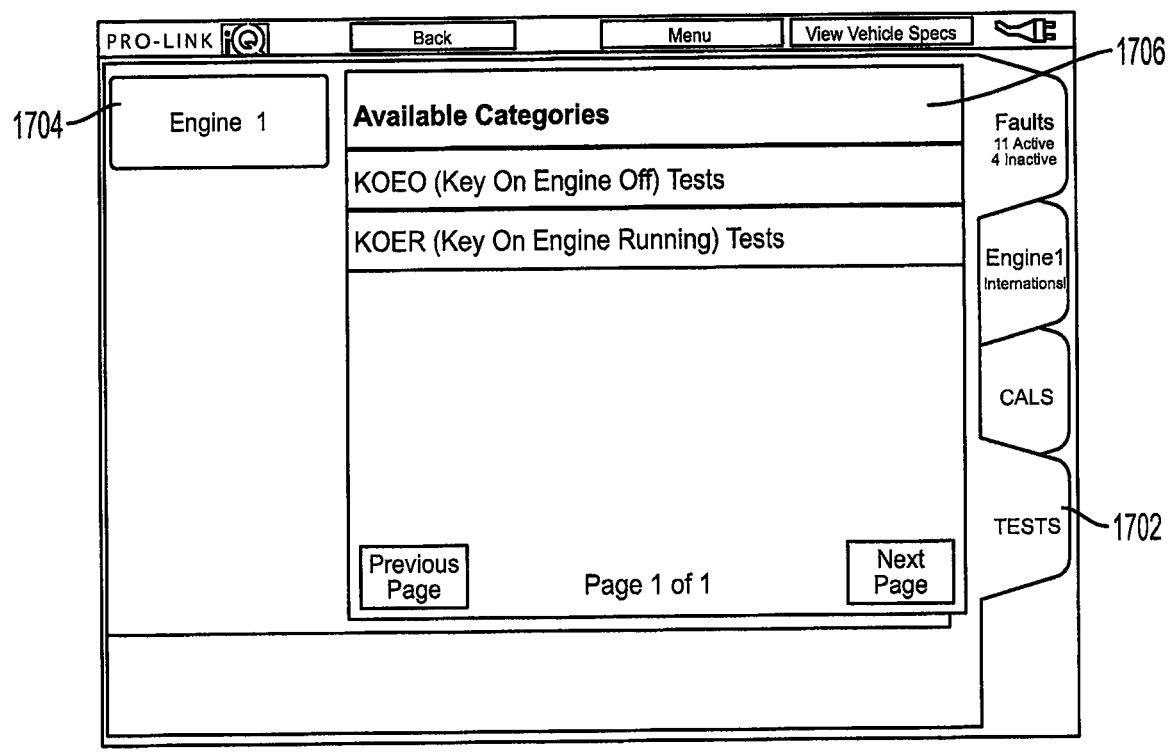

FIGS. 17A-17B illustrates an exemplary test tab 1702, listing the special tests available for ECUs on-board the vehicle. The first time the test tab 1702 is selected, a message may instruct the user to select an ECU. If an ECU does not contain any special tests, a message is displayed to reflect the same. In response to a message instructing the user to select an ECU, the user may select an engine 1704, which may result in the display of available test categories 1706. A test category is a collection of related data points required to run a special test.

Each ECU may contain zero or more test categories. Each test category may contain one or more test data points. The test data points may be displayed in response to user's selection of a particular test category within the list 1706. Each test is unique to the type of ECU and type of testing being performed; however, most test screens display some common elements. The common elements include: the title of the test across the top of the screen, a "Start Test" button, and a "Quit Test" button. While a special test is running, the test tab 1702 may be locked and the title bar buttons may be disabled.

Another aspect of this disclosure relates to increased copy protection for software. As noted above, the software application installed in the diagnostic tool may run in evaluation mode with right of limited usage. Once the user exceeds the limited usage right, the software application may be locked and the user may have to subscribe and/or make a payment to unlock the application and continue further usage. The user may download the application to the diagnostic tool from several locations and at any time. For example, the user may download the application from a server providing services for the diagnostic tool. Alternatively or additionally, the user may obtain a copy of the software application from friends.

To this end, the user may need a product key to first register the diagnostic tool. The product key may be obtained directly from a distributor or may be obtained via Internet or phone. The user establishes communication with a relevant server and requests registration of the diagnostic tool. In response, the server may seek the serial number and the product key associated with the diagnostic tool. The user provides this information to the server.

The server may check to ensure that the product key is not associated with other diagnostic tools. If the product key is not associated with any other diagnostic tool, the server registers the product key against the serial number of the diagnostic tool and informs the user that the registration was successful. If the product key is associated with another diagnostic tool, the server may not register the diagnostic tool with the provided product key and may inform the user that the registration was unsuccessful. The server may inform the user that the product key has been registered for another diagnostic tool and may request that the user provide another product key to perform the registration.

Once the diagnostic tool is registered, the user may wish to activate one or more software applications. The one or more software applications may include software applications in evaluation mode and expired on the diagnostic tool or may include software applications in evaluation mode and not yet expired on the diagnostic tool. In either case, to activate the one or more software applications, the user may provide the product key for the software application to the server. The server may check to determine if the product key for the software application is valid. For example, the server ensures that the product key does not belong to another software application or has not been used to activate the requested software application in other diagnostic tools. In one implementation, the product key may include a serial number associated with the diagnostic tool.

Once the verification is performed successfully, the server provides an activation key to the user, which the user may enter into the diagnostic tool to activate the software application. The activation code may include a twenty-six character alphanumeric code. The activation of the software application can be performed manually or automatically.

Under the "Admin" program, there is an "Activation" software button which may be used to activate software programs manually. When the "Activation" software button is selected, the diagnostic tool may display the installed software applications. The user may select one of the installed software applications for activation. In response, a user interface may be displayed to the user seeking the associative activation key for the software application. The user can enter the activation key manually. The diagnostic tool may perform a verification to ensure that the activation key is proper. If so, the diagnostic tool activates the software application, enabling the user to, for example, use the application without restrictions. If the activation key is not valid, the diagnostic tool informs the user of the same and requested a valid activation key.

Without a valid activation code, even if a software application with copy protection is properly downloaded, it cannot be properly used by the diagnostic tool if the right of usage has expired, for example. An activated software application may run properly only on a specific diagnostic tool used to activate the software application. If a copy of the software application is made and executed on a different diagnostic tool, the software application may become unusable. Additionally, the activation code may contain an expiration date. When the diagnostic system executes or accesses the software, the activation code will be read out and compared with system time to determine whether the activation code (e.g., a license) is valid.

In one aspect, the activation code is checked every time the software is executed. The code may be stored at a specific location, physical or logical, for access by the software for security check. The user does not need to enter the activation code manually. The embodiments described herein may be used with any types of vehicles, with or without wheels, that are propelled for transporting people, cargo, goods, etc. and/or performing prescribed tasks. The vehicles include passenger vehicles, cargo vehicles, heavy duty vehicles, construction equipment, agricultural equipment, industrial equipment, harvest equipment, paving equipment, etc., and the like. Examples of vehicles include a truck, a boat or ship, a motorcycle, a generator, an airplane, a trailer, a trailer truck, a helicopter, a passenger car, a truck, a heavy duty vehicle, a tractor, construction equipment, a compactor, a bulldozer, a excavator, etc., and the like. Those vehicles may be powered by fossil fuels, such as gasoline, natural gas, propane and the like, electricity, such as that generated by battery, magneto, fuel cell, solar cell and the like, wind and hybrids or combinations thereof.

Additional aspects and features of the disclosure are further described in the attached Appendices. In the Appendices, an exemplary scan tool is referred to as Pro-Link iQ.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure. It is to be understood that the disclosure is capable of use in various other combinations and environments and is capable of changes or modifications within the scope of the inventive concept as expressed herein.

Figure 18:
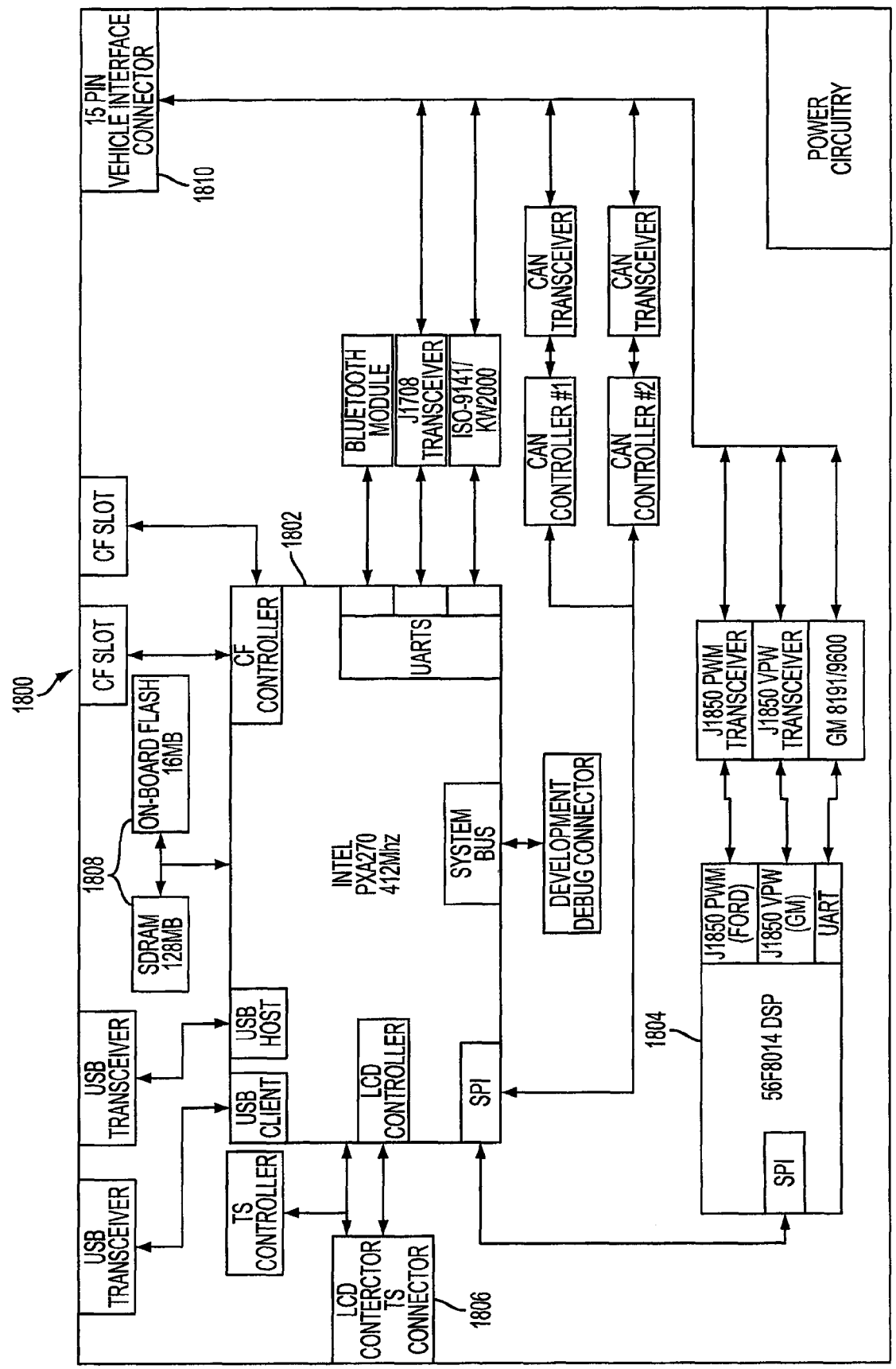
FIG. 18 illustrates a block diagram of another implementation of scan tool 20 shown in FIG. 2.

For example, scan tool 20 may have configurations different from the one shown in FIG. 2. FIG. 18 illustrates a block diagram of another implementation of scan tool 20 shown in FIG. 2. As shown, scan tool 1800 includes a processor 1802, a communication interface 1804, a display connector 1806, a memory 1808, and a connector interface 1810. The diagnostic tool 1800 includes all the components that allow the diagnostic tool 1800 to function as a scan tool and/or an inspection tool.

The Communication interface 1804 communicates with the vehicle communication interface through the connector interface 1810, using one or more preset communication protocols. The one or more communication protocols include J1850 (VPM and PWM), UART.

The processor 1802 may include Intel Xscale processor PXA270 running at 412 Mhz. In one implementation, processor 1802 includes a USB host interface, a USB client interface, a Compact Flash ("CF") controller, a UARTs interface, an LCD controller, a system bus interface, and a Serial Peripheral Interface ("SPI") bus. The USB host interface can connect processor 1802 to a printer or an external Vehicle Communication Interface ("VCI") to support other protocols. The USB client interface can connect processor 1802 to a PC for data transfer, software updates, etc. The CF controller can connect processor 1802 to two CF sockets—one for 802.11G wireless card and one for application updates or vehicle data storage. The UARTs interface can connect processor 1802 to connector interface 1810 via Bluetooth module, J1708 transceiver and/or ISO-1941 KW2000. The processor 1802 also can connect to connector interface 1810 via SPI bus, which is connected to the SPI bus on communication interface 1804.

The LCD controller can connect processor 1802 to a display through LCD connector 1806 in order to output the desired information to the user. The system bus interface can connect processor 1802 to development debug connector. A data storage device, including a memory subsystem 1808, may include 16 MB of on board Flash and 128 MB of SDRAM running at 100 Mhz. Software to run the diagnostic tool 1800 can be stored in the memory subsystem 1808, including any database.

Other implementations are contemplated.

What is claimed is:

1. A diagnostic tool for a vehicle configured to automatically identify different types of Electronic Control Units (ECUs) on-board the vehicle and automatically launch software applications for interacting with the ECUs, the diagnostic tool comprising:
   a connector connectable to a data port of the vehicle;
   a data processor; and
   a data storage device configured to store a list of installed software applications for interacting with respectively associated ECU types on-board the vehicle, wherein:
   the data processor automatically initiates communications with the ECUs on-board the vehicle using a first communication protocol and if the data processor receives a response comporting to the first communication protocol, the data processor determines that a first ECU on-board the vehicle is using the first communication protocol, uses the first communication protocol to communicate with the first ECU and, based on the communication with the first ECU, automatically launches one of the installed software applications associated with the first ECU, and
   the data processor automatically initiates communications with the ECUs on-board the vehicle using a second communication protocol and if the data processor receives a response comporting to the second communication protocol, the data processor determines that a second ECU on-board the vehicle is using the second communication protocol, uses the second communication protocol to communicate with the second ECU and, based on the communication with the second ECU, automatically launches one of the installed software applications associated with the second ECU;
   wherein the installed software applications are different from the first and second communication protocols.

2. The diagnostic tool of claim 1, wherein:
   the data processor generates a list identifying ECUs communicating with the first communication protocol and ECUs communicating with the second communication protocol.

3. The diagnostic tool of claim 1, wherein:
   the data processor automatically initiates communications with the ECUs on-board the vehicle using a third communication protocol and if the data processor receives no response comporting to the third communication protocol, the data processor determines the vehicle does not include ECUs comporting to the third communication protocol.

4. The diagnostic tool of claim 1, wherein:
   the data processor sequentially initiates communications with the ECUs on-board the vehicle using the first and second communication protocols.

5. The diagnostic tool of claim 1, wherein:
   the data processor concurrently initiates communications with the ECUs on-board the vehicle using the first and second communication protocols.

6. The diagnostic tool of claim 1, wherein:
   the list of software applications includes diagnostic applications associated with different vehicles serviced by the diagnostic tool.

7. The diagnostic tool of claim 1, wherein:
   the vehicles include passenger vehicles, cargo vehicles, heavy duty vehicles, construction equipment agricultural equipment, industrial equipment, harvest equipment, or paving equipment.

8. The diagnostic tool of claim 1, wherein:
   the ECUs include at least one of a powertrain control module (PCM), an engine control module (ECM), a transmission control module (TCM), an anti-locking brake system (ABS), and an air bag control module.

9. The diagnostic tool of claim 1, further comprising:
   a connection driver configured to control coupling of the connector to the data port of the vehicle.

10. The diagnostic tool of claim 1, further comprising:
    an input device configured to receive an input from the user.

11. The diagnostic tool of claim 1, wherein:
    the input device is configured to receive user's protocol preferences or types of vehicles serviced by the diagnostic tool.

12. The diagnostic tool of claim 1, wherein:
the communication protocols include at least one of CAN, J8150, ISO9141, J1708, J1939, or 160 Baud.

13. The diagnostic tool of claim 1, wherein:
the data processor is further configured to use the list of software applications stored at the storage device to automatically identify a software application associated with the first ECU and a software application associated with the second ECU.

14. The diagnostic tool of claim 1, wherein:
the software applications are usable to transfer and process information to or from the ECUs on-board the vehicle.

15. The diagnostic tool of claim 1, wherein:
the software applications are usable to retrieve error codes from the ECUs on-board the vehicle or to update calibrations of the ECUs on-board the vehicle.

16. The diagnostic tool of claim 1, wherein:
the diagnostic tool enables the user to manually select a software application for identified ECUs on-board the vehicle.

17. The diagnostic tool of claim 1, wherein:
the software applications include at least one of OEM applications and industry standard applications.

18. The diagnostic tool of claim 1, wherein:
the software applications comprise diagnostic applications, and include evaluation software applications which are subject to a limited number of usages.

19. The diagnostic tool of claim 18, wherein:
the diagnostic tool solicits from the user an activation key to unlock software applications that have exceeded their limited number of usages.

20. The diagnostic tool of claim 19, wherein:
the data processor receives the activation key from the user for unlocking a particular software application, and
the data processor verifies the received activation key to ensure that it corresponds to the particular software application and the diagnostic tool.

21. A method for activating a software application on a diagnostic tool, the method comprising:
storing software applications installed on the diagnostic tool, wherein the software applications are for interacting with respectively associated ECU types on-board a vehicle;
initiating communications with ECUs on-board the vehicle using a first communication protocol and if a response comporting to the first communication protocol is received, determining that a first ECU on-board the vehicle is using the first communication protocol, using the first communication protocol to communicate with the first ECU and, based on the communication with the first ECU, automatically launching one of the installed software applications associated with the first ECU, and
initiating communications with the ECUs on-board the vehicle using a second communication protocol and if a response comporting to the second communication protocol is received, determining that a second ECU on-board the vehicle is using the second communication protocol, using the second communication protocol to communicate with the second ECU and, based on the communication with the second ECU, automatically launching one of the installed software applications associated with the second ECU;
wherein the installed software applications are different from the first and second communications protocols;
receiving, from a user, a first key and a serial number associated with the diagnostic tool;
determining whether the first key corresponds to the serial number associated with the diagnostic tool;
upon determining that the first key corresponds to the serial number associated with the diagnostic tool, registering the diagnostic tool;
receiving, from the user, a request for activating one of the software applications stored on the diagnostic tool;
in response to the request, requesting from the user a second key associated with the software application;
receiving, from the user, the second key associated with the software application;
determining whether the second key is valid; and
upon determining that the second key is valid, providing an activation key to the user for activating the software application on the diagnostic tool.

22. The method of claim 21, wherein:
the software application includes a software application that is in evaluation mode and expired.

23. The method of claim 21, wherein:
determining whether the second key is valid includes determining whether the second key does not belong to another software application.

24. The method of claim 21, wherein:
determining whether the second key is valid includes determining whether the second key has not been used to activate the software application in another diagnostic tool.

* * * * *